(12) United States Patent
Danilo

(10) Patent No.: US 7,831,908 B2
(45) Date of Patent: Nov. 9, 2010

(54) METHOD AND APPARATUS FOR LAYOUT OF TEXT AND IMAGE DOCUMENTS

(76) Inventor: Alexander Vincent Danilo, 9 Kooloora Avenue, Harbord New South Wales 2096 (AU)

( * ) Notice: Subject to any disclaimer, the term of this patent is extended or adjusted under 35 U.S.C. 154(b) by 1355 days.

(21) Appl. No.: 11/133,612

(22) Filed: May 20, 2005

(65) Prior Publication Data

US 2006/0265649 A1 Nov. 23, 2006

(51) Int. Cl.
*G06F 17/21* (2006.01)
(52) U.S. Cl. .................. 715/245; 715/244; 715/256; 715/269
(58) Field of Classification Search .............. 715/200, 715/225, 226, 244, 245, 256, 269
See application file for complete search history.

(56) References Cited

U.S. PATENT DOCUMENTS

| | | | |
|---|---|---|---|
| 5,151,975 A | 9/1992 | Shiraki et al. | 395/153 |
| 5,287,443 A | 2/1994 | Mameda et al. | 395/146 |
| 6,014,733 A | 1/2000 | Bennett | 711/216 |
| 6,081,816 A | 6/2000 | Agrawal | 707/521 |
| 6,438,516 B1 | 8/2002 | Davis | 704/8 |
| 6,717,580 B1 | 4/2004 | Tang | 345/467 |
| 2002/0026475 A1* | 2/2002 | Marmor | 709/203 |
| 2002/0052749 A1* | 5/2002 | Bauer | 704/277 |
| 2002/0059224 A1* | 5/2002 | McConnell et al. | 707/5 |
| 2002/0078051 A1* | 6/2002 | Ullmann | 707/10 |
| 2002/0118885 A1* | 8/2002 | Smeets et al. | 382/246 |
| 2002/0120654 A1* | 8/2002 | Xu | 707/536 |
| 2002/0146181 A1* | 10/2002 | Azam et al. | 382/309 |
| 2006/0100857 A1* | 5/2006 | Wissink et al. | 704/10 |
| 2006/0101015 A1* | 5/2006 | Wissink et al. | 707/6 |

OTHER PUBLICATIONS

The Unicode Standard, Addison-Wesley Developers Press, 2003. ISBN 0-321-18578-1 Davis, Mark. Unicode Technical Report #9: "The Bidirectional Algorithm"; available on http://www.unicode.org/reports/tr9/tr9-15.html, pp. 1-36.
Apple Computer Inc. MacOS X Mar. 2005 Developer reference library: Rendering Unicode Text with ATSUI, Dec. 2, 2002 pp. 32-37.

(Continued)

*Primary Examiner*—Stephen S Hong
*Assistant Examiner*—Gregory J Vaughn
(74) *Attorney, Agent, or Firm*—St. Onge Steward Johnston & Reens LLC

(57) ABSTRACT

A mixed text and image layout algorithm capable of supporting Unicode text and arbitrary content definitions for geometric layout with worst case two-pass layout placement procedure. Layout of Unicode text requires a number of distinct processing steps commencing with classification of input characters into contiguous groups of identical directionality, writing system and possibly script (and language) followed by mapping of character groups to glyphs for display purposes followed by a layout taking into account font display characteristics, embedded directionality level and shape of container for layout contents. Layout is best-case achieved in a single layout pass and worst-case in two passes. During layout information is cached to facilitate incremental changes to an existing layout in order to minimize refresh operations for editing display purposes. An optional two-pass operation on the layout result may be used to generate ordered rendering operation to support so-called Z-index display. An optimized Unicode character classification method utilizing reduced memory is also disclosed. Additionally a method to selectively display caret location for mixed font and/or directional text is disclosed.

18 Claims, 14 Drawing Sheets

OTHER PUBLICATIONS

F. Avery Bishop et al. Microsoft Corp. Supporting Multilanguage text language and complex scripts with Windows 2000; available on http://www.microsoft.com/typography/developers/uniscribe/intro.htm, pp. 1-20.

Tim Bray et al. Extensible Markup Language (XML) 1.0 (Third Edition), W3C Recommendation Feb. 4, 2004; availabe on http://www.w3.org/TR/REC-xml/, pp. 1-60.

Steven Pemberton et al. XHTML 1.0 The Extensible HyperText Markup Language. W3C Recommendation Jan. 26, 2000; available on http://www.w3.org/TR/2000/REC-xhtm11-20000126/, pp. 1-22.

Bert Bos et al. Cascading Style Sheets, level 2 CSS Specification, W3C Recommendation May 12, 1998; available on http://www.w3.org/TR/REC-CSS2/, pp. 1-338.

* cited by examiner

| A | B | C | D | E | F | G | H | I |
|---|---|---|---|---|---|---|---|---|

← 30

| A | B | C | D | E | F | G | H | I |
|---|---|---|---|---|---|---|---|---|
| 0 | 1 | 2 | 3 | 4 | 3 | 2 | 1 | 0 |

← 31

← 32

| A | H | G | F | E | D | C | B | I |
|---|---|---|---|---|---|---|---|---|
| 0 | 1 | 2 | 3 | 4 | 3 | 2 | 1 | 0 |

← 33

← 34

| A | H | C | D | E | F | G | B | I |
|---|---|---|---|---|---|---|---|---|
| 0 | 1 | 2 | 3 | 4 | 3 | 2 | 1 | 0 |

← 35

← 36

| A | H | C | F | E | D | G | B | I |
|---|---|---|---|---|---|---|---|---|
| 0 | 1 | 2 | 3 | 4 | 3 | 2 | 1 | 0 |

| | BIDI EMBED LEVEL | STACK MIN | STACK MAX | END 'X' |
|---|---|---|---|---|
| S↓ ↓E<br>[A]<br>[0] ← 40 | 0 | EMPTY | | 1 |
| ↓E<br>[A][B]<br>[0][1] ← 41<br>↔ | 1 | 1 | 2 (42) | 2 |
| ↓E<br>[A][C][B]<br>[0][2][1]<br>↔ | 2 | 1<br>1 | 2<br>3 | 3 |
| ↓E<br>[A][C][D][B]<br>[0][2][3][1]<br>↔ ↔ | 3 | 2<br>1<br>1 | 3<br>3<br>4 | 4 |
| ↓E<br>[A][C][E][D][B]<br>[0][2][4][3][1]<br>↔ ↔ | 4 | 2<br>2<br>1<br>1 | 3<br>4<br>4<br>5 | 5 |
| ↓E<br>[A][C][F][E][D][B]<br>[0][2][3][4][3][1]<br>↔ ↔ | 3 | 2<br>1<br>1 | 5<br>5<br>6 | 6 |
| ↓E<br>[A][C][F][E][D][G][B]<br>[0][2][3][4][3][2][1]<br>↔ ↔ | 2 | 1<br>1 | 6<br>7 | 7 |
| ↓E<br>[A][H][C][F][E][D][G][B]<br>[0][1][2][3][4][3][2][1]<br>↔ | 1 | 1 | 8 | 8 |
| ↓E<br>[A][H][C][F][E][D][G][B][I]<br>[0][1][2][3][4][3][2][1][0] | 0 | EMPTY | | 9 |

*FIG. 4*

METHOD AND APPARATUS FOR LAYOUT OF TEXT AND IMAGE DOCUMENTS

FIELD OF THE INVENTION

This invention relates generally to the field of computer processing of text, document display and editing for desktop publishing and hypertext document display and editing where text is represented according to the Unicode standard in a computer system.

BACKGROUND OF THE INVENTION

Computer systems required to display and edit documents typically require a software application to interpret the contents of a file on disk and format the file contents for display as a document. In most cases the contents of a document file on disk are encoded using a standardized encoding scheme. International text is commonly encoded using the Unicode standard published by Unicode Inc (The Unicode Standard, Addison-Wesley Developers Press, 2003. ISBN 0-321-18578-1). Document structure may also be encoded using a standardized encoding scheme such as XML published by the World-Wide-Web Consortium.

The Unicode standard provides means to encode international characters for many languages of the world with the intention of allowing display of files conforming to the Unicode standard. In general a Unicode file contains sequences of distinct characters whose value may be encoded using a single 32-bit word (UTF-32) or in a number of alternate encodings using a plurality of either 8-bit (UTF-8) or 16-bit (UTF-16) words. A single Unicode character may always be converted between any such encoding but alternate encodings always refer to a single Unicode character or code-point.

The display of Unicode on a computer display requires an application program to convert the Unicode characters into a form suitable for display. The display of internationalized text requires the mapping of Unicode characters into so-called 'glyphs' for output. Glyphs are outlines of written language that may be visually recognized by a reader of a given language. Mapping of Unicode characters to glyphs is not restricted to a 1:1 mapping, there being the common occurrence of multiple Unicode characters mapping to 1 glyph (m:1), a single Unicode character mapping to multiple glyphs (1:n) and multiple Unicode characters mapping to multiple glyphs (m:n).

A document display system capable of generating an image of a Unicode text document must first convert the characters into glyphs and then lay out the glyphs onto lines of text for display purposes. In different languages the written order of text may be visually different to the logical order. For example in Hebrew text the order of characters for written text is rightmost first and subsequent characters are written to the left of preceding characters, this is known as 'right-to-left' text. In English text the order of characters for written text is leftmost first and subsequent characters are written to right of preceding characters, this is known as 'left-to-right' text.

Mixing characters from different directionality such as a Hebrew quotation inside English text requires that the display program apply the Unicode Bidirectional Algorithm prior to display of glyphs (Davis, Mark. Unicode Technical Report #9: THE BIDIRECTIONAL ALGORITHM; http://www.unicode.org/reports/tr9/tr9-15.html). The Unicode Bidirectional algorithm as published teaches the steps required to correctly position output glyphs for an entire paragraph of character text. A paragraph is defined to be a contiguous group of characters containing no line or paragraph break character codes. Whilst the Bidirectional algorithm describes the processing required to lay out a paragraph of characters on an imaginary infinitely long line it omits description of how a mixture of bidirectional text may be broken into shorter lines of text. The Bidirectional algorithm further states that although the described processing steps are defined for application on entire paragraphs of text there is nothing preventing an implementation generating an equivalent result by the use of an incremental or piece-wise algorithm although no such incremental algorithms are presented.

Use of the Bidirectional algorithm requires classification of each Unicode character according to its bidirectional characteristics. In order to classify each character the Unicode Consortium provides a database of characteristics for each code point. As of Unicode Version 4.0 there are 96,382 defined code points. Each code point may be classified into one of 19 character types. The most common way to obtain the bidirectional character type for a Unicode character is to include a lookup table for each character. Given that most current computer systems operate on binary octets or 8-bit data, the size of such a table is large. For Unicode 4.0 it would consume 96,382 bytes at minimum. Alternate approaches to reducing the size of such a lookup table may include compression but the Unicode Specification does not disclose any applicable methods. Existing prior art methods that reduce the memory consumption for classification of a Unicode character include the binary tree approach whose classification requires storage of conditional range values and exhibits a lookup cost of log(N) comparisons resulting in a worst-case comparison depth of seventeen (17) comparison as well as the storage of comparison values at each node in the comparison tree, whilst the so-called perfect-hash approach stores a linear exception list which contains classification values for each exception character value whose classification is outside of the single largest classification set. A perfect-hash exception table for the bidirectional character properties in the Unicode character database encodes all the Unicode character values (for the exemplary version Unicode 4.0) whose classification is outside the dominant 'left-to-right' character type and consists of 5,124 entries, typically resulting in an encoded perfect-hash table of size 5,124 bytes, such a perfect hash exhibiting compact size but typically incurring a significant computational cost to compute the perfect-hash function as would be familiar to those skilled in the art of mathematical hash functions and computer science.

The Extensible Markup Language (XML) is a text based data serialization that facilitates structured storage of documents in a file on a computer system (Tim Bray et al. Extensible Markup Language (XML) 1.0 (Third Edition), W3C Recommendation 4 Feb. 2004; http://www.w3.org/TR/REC-xml/, Steven Pemberton et al. XHTML 1.0 The Extensible HyperText Markup Language. W3C Recommendation 26 Jan. 2000; http://www.w3.org/TR/2000/REC-xhtml1-20000126). XML builds on Unicode as the textual representation and adds structure to a document. Various XML vocabularies may be used to store any number of document types. For example World-Wide-Web pages may be codified in XHTML which is an XML compliant encoding of the so-called Hypertext Markup Language (HTML). XML may also be used as the file storage format for word processing documents as for example the WordML XML Schema produced by Microsoft Corporation for the encoding and storage of documents compatible with the Microsoft Word computer application program.

Interpretation of an XML vocabulary and display of an appropriate presentation to a user of a computer system requires decoding of the contents of an XML file and layout of such contents. The contents of an XML file may contain a mixture of Unicode text data as well as encoded images. Some XML file vocabularies may additionally reference external image data through a defined referencing mechanism for the vocabulary. The layout and display of such XML files is not described by the XML Recommendation however presentation guidelines may be published in other documents authored by various organizations.

The Cascading Style Sheets (CSS) Specification defines presentation characteristics for XML based documents (Bert Bos et al. Cascading Style Sheets, level 2 CSS Specification, W3C Recommendation 12-May-1998; http://www.w3.org/TR/REC-CSS2/). CSS supplies rules for matching an XML element name to the desired display characteristics for the element contents, such as font color, etc. CSS also provides mechanisms to specify the drawing order of objects inside an XML file.

Whilst the Unicode, XML, XHTML and CSS specifications define a model for display of document data through a series of rules and illustrations they do not provide algorithms for an application developer to utilize to achieve the desired output result image. Similarly many of the descriptions of display treat an XML document as a whole as no piece-wise modification of such a displayed document is described.

Layout and display of XML based documents such as XHTML in combination with CSS documents assume a tree-based data structure model which maps naturally onto a layered presentation model. These tree based models are ideal for batch layout of an entire document as layout constraints may be easily dealt with given an in-memory tree representation of a document. Computer display of a tree-based document model usually requires the application program to traverse the tree to build a so-called 'flattened' view of the tree as would be familiar to those skilled in the art of computer science. Such a flattened view translates the structured nodes in a tree into a linear presentation suitable for display purposes. The flattened view presents the user with logical linear flow such as, for example, lines of text structured firstly into paragraphs and then further into pages. Document editing and interaction at the computer display by a user usually requires interaction with the flattened view. Programmatically editing a tree-based document model usually requires modification of a sub-tree within the document and subsequent repeated layout of the entire document tree. CSS also supports the concept of Z-index which is a definition of the order in which sub-trees in the original document are painted with the result being a layered drawing representation under control of the document author. Editing such Z-indexed content can require redrawing the entire document tree after any modification. Handling partial updating of such a tree-based model for editing purposes is absent in all XHTML and CSS specifications as it is not considered as part of the design model for display of such documents.

The display of such documents usually consists of a mixture of Unicode text converted into glyphs and images interspersed according to some geometric rules. Such documents are not limited to XML based documents but are part of a broader category of document most commonly associated with so-called desktop publishing systems.

One characteristic of desktop publishing systems is the requirement that the document be modified interactively by a user of an application program on a computer system. When editing textual documents, it is common for the application program to display an indicator at the current insertion point in a document. This insertion point is known to those skilled in the art as a 'caret'. The caret is commonly displayed to the user in some form that makes it visually distinguishable from the document itself. The caret may be displayed as a flashing or blinking object at a given insertion point.

The insertion point in a Unicode text document lies on the boundary of a Unicode character point. As a number of Unicode characters may generate (m:n) mappings, all Unicode characters are not necessarily textual delimiters for editing purposes. As user interaction with a document is performed on the displayed glyph presentation, selection of insertion point is done relative to glyph locations. A group of glyphs surrounded by text insertion locations suitable for caret placement are known as 'grapheme clusters'. The caret is usually placed at the boundary of a grapheme cluster.

Most desktop publishing systems place a single caret at grapheme cluster boundaries. Should the boundary lie at the point of change of text display characteristics such as a change in font color, the insertion of text at the caret position usually follows a fixed rule as to which font characteristic is used to display the text insertion. For example, the font color of the text to the right of the caret may always be used to select the color for the inserted text. Should a continuous word contain mixed colors, a fixed rule is usually chosen to select the insertion text color as there is only one distinct caret position at each grapheme boundary.

When the caret lies at the boundary between text of different directionality it is common to choose the insertion direction corresponding to an application program setting that specifies the dominant text direction. For example if the caret were set to a point between a text display in Hebrew and a text display in English, the application could determine that Hebrew was the preferred text entry setting and insert characters into the Hebrew text complying with the needs of right-to-left text entry. Similarly, if the application setting was set to English dominant, then the text would be inserted adjacent to the English text in a left-to-right manner. Some systems also display a so-called 'split' caret with a partial caret displayed at both potential text insertion positions as an aid to the user of the application program. The user may then choose the dominant text direction manually to select the insertion position.

It is a deficiency in such document editing applications that the user must take additional steps to specify insertion font characteristics and/or text direction following the placement of the caret by use of a pointing device such as a mouse.

SUMMARY OF THE INVENTION

It is an object of the present invention to ameliorate one or more limitations in existing systems for the purpose of display and editing of documents on a computer.

According to first aspect of the invention, there is provided a method of determining the Unicode character property of a Unicode character value comprising the steps of: selecting the subset of Unicode character values that contain the character value by range comparison; and selecting Unicode character property by use of table lookup in the selected subset of Unicode character values.

According to a second aspect of the invention, there is provided a method of positioning a plurality of Unicode textual character sequences of like directionality in storage sequence onto a display line comprising the steps of: setting an equal insertion point for all Unicode Bidirectional embedding depth levels at the start point of insertion for the start point of the line; and placing a sequence of like directionality Unicode characters at the insertion point; and updating the end point of line insertion according to the dimensions of the sequence of like directionality Unicode characters; and generating an insertion stack of insertion minimum and maximum positions for each Unicode Bidirectional embedding depth; and updating entries in the insertion stack for each insertion of a sequence of like directionality Unicode characters.

According to a third aspect of the invention, there is provided a method of modifying existing lines of textual display comprising the steps of: identifying the geometric insertion position; locating the in-memory buffer location corresponding to the insertion position; inserting an in-memory representation of the modification into the in-memory buffer at the in-memory buffer location corresponding to the insertion point; locating the in-memory buffer location corresponding to the start of the line of text containing the insertion position; geometrically placing the in-memory buffer data from the location corresponding to the start of the line up to the inserted in-memory representation of the modification; geometrically placing the in-memory representation of the modification; and geometrically placing in-memory buffer data following the modification until said placement produces no change in geometric positioning for the in-memory data.

According to a fourth aspect of the invention, there is provided a method of positioning a visual editing feedback display comprising the steps of: obtaining the selection point on a visual representation of text; obtaining the storage buffer insertion offset closest to the selection point; obtaining the displayed glyph intersected by the selection point; retrieving the display characteristics of the displayed glyph at the selection point; and using the display characteristics of the displayed glyph as formatting characteristics of inserted data at the storage buffer insertion offset closest to the selection point.

According to a fifth aspect of the invention, there is provided a method of generating a first positioning of a plurality of Unicode textual character sequences of like directionality in storage sequence onto a display line comprising the steps of: setting an equal insertion point for all Unicode Bidirectional embedding depth levels at the start point of insertion for the start point of the line and setting a given line height; placing a sequence of like directionality Unicode characters at the insertion point bounded by the given line height; updating the end point of line insertion according to the dimensions of the sequence of like directionality Unicode characters; generating an insertion stack of insertion minimum and maximum positions for each Unicode Bidirectional embedding depth; updating entries in the insertion stack for each insertion of a sequence of like directionality Unicode characters; upon encountering an additional sequence of like directionality Unicode characters with increased line height performing a second positioning of all positioned sequences of like directionality Unicode characters at the increased line height; and choosing a given first positioning or a second positioning of sequences of like directionality Unicode characters.

According to a sixth aspect of the invention, there is provided a method of positioning a plurality of Unicode textual character sequences of like directionality in storage sequence or externally defined image data onto a display line comprising the steps of: setting an equal insertion point for all Unicode Bidirectional embedding depth levels at the start point of insertion for the start point of the line; placing a sequence of like directionality Unicode characters or an externally defined image data object at the insertion point; updating the end point of line insertion according to the dimensions of the sequence of like directionality Unicode characters or externally defined image object; generating an insertion stack of insertion minimum and maximum positions for each Unicode Bidirectional embedding depth; and updating entries in the insertion stack for each insertion of a sequence of like directionality Unicode characters or externally defined image object.

BRIEF DESCRIPTION OF THE DRAWINGS

The advantages of the invention may be better understood by referring to the above prior art description and further referring to the following description of the preferred embodiments in conjunction with the accompanying drawings in which:

FIG. 2 is a diagram illustrating the prior art iterative steps required to generate a display form of a document containing Unicode textual data from the storage form;

FIG. 4 depicts the method for iteratively positioning Unicode text data into suitable display form;

DESCRIPTION OF PREFERRED AND OTHER EMBODIMENTS

The present invention includes a method and apparatus for reading document data files from storage whose content includes a mixture of Unicode text data, inline or referenced image data and formatting metadata with the generated result being a visual display of such data for the purposes of user visualization and editing of the document data files.

Figure 1:
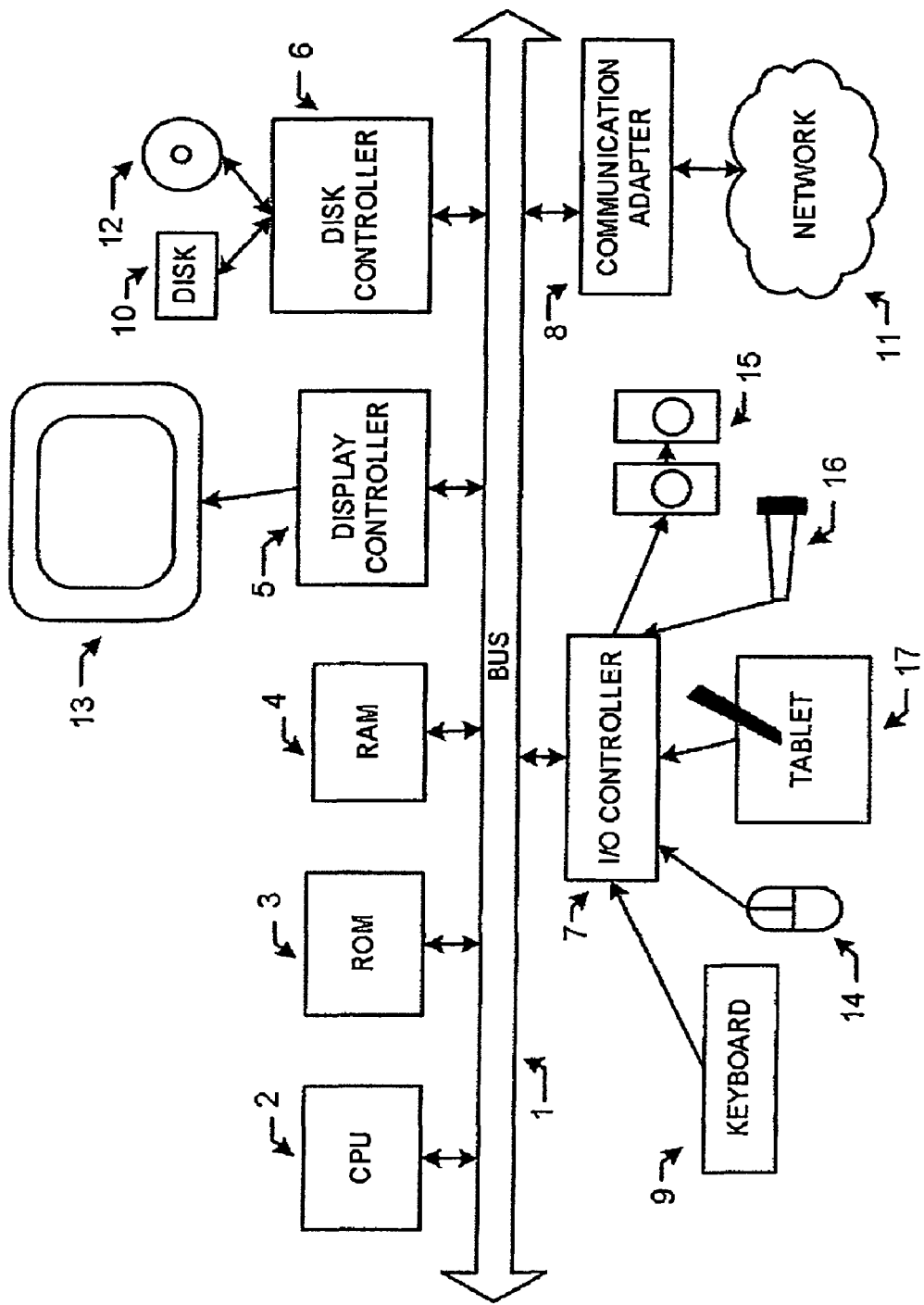
FIG. 1 is a conceptual block diagram of a prior art computer system architecture suitable for use with the present invention.

FIG. 1 illustrates a computer system architecture on which the present invention may be implemented. Whilst FIG. 1 is for descriptive purposes only and refers to an example computer architecture on which the invention may be implemented, the description and contents apply equally to other systems including systems having architectures dissimilar to FIG. 1.

With reference to FIG. 1, a bus 1 interconnects the components of a computer system which includes a central processing unit (CPU) 2 used to process data and execute software programs, a read-only memory (ROM) 3 used to store system start-up program instructions, a random access memory (RAM) 4 used for temporary storage of system data, a display controller 5 used to generate visual representation of data for display devices, a disk controller 6 used to manage storage of rewritable or permanent data, an input and output (I/O) controller 7 used to process user interaction with the computer system and a communication adapter 8 used to transfer data between the computer system and external networks consisting of other computer systems. The display controller 5 connects to a display device 13 which is used to display the output of programs running on the computer system. The disk controller 6 may be connected to a rewritable storage device such as a hard disk 10 which may be used for the storage of programs and data and may also be connected to a non-volatile storage device such as a DVD-drive 12 which hosts read-only media containing data and programs. Input to the computer system is managed by the I/O controller 7 via connected peripheral devices such as a keyboard 9, pointing devices such as a mouse 14 or a tablet 17 and sound input devices such as a microphone 16 and sound output devices such as speakers 15. The computer system may be connected to an external network of similar computer systems or compatible devices through the communication adapter 8 connected to an external network 11.

Referring to FIG. 2 for descriptive purposes only, the prior art technique of display of Unicode textual data requires the conversion from storage order into display order prior to visual display. A sequence of Unicode characters 30 is depicted containing an example textual character data sequence 'ABCDEFGHI'. The example character data sequence is associated in 31 with an example Unicode Bidirectional level value sequence of '012343210' as described in the Unicode technical report number nine (UAX#9). UAX#9 stipulates a number of steps required to convert textual storage order into an order suitable for visual display of Unicode text data. The characters delimited by 32 show the first Unicode Bidirectional embedding level requiring reorder according to UAX#9, those being characters one through seven in the storage array in 31. Illustration 33 shows the result of reorder of the characters in the range delimited 32. UAX#9 then requires reordering of the next Unicode Bidirectional embedding level, that being 34. Illustration 35 shows the result of reorder of the characters in the range delimited 34. The next stage of reorder requires the characters in the range delimited 36 to be reordered resulting in the visual display order shown in 37. The final range shown as 38 requires no reorder as it is a single character point, thus the final display order is 'AHCFEDGBI'.

These sequential reorder steps are required of UAX#9 in order to present to the user a readable visual display of stored character Unicode text content.

Figure 3A:
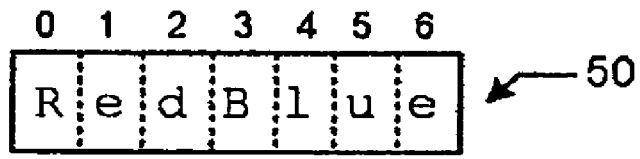
FIG. 3A is a diagram illustrating the storage of textual data in a document data file in the typical prior art system.
Figure 3A:
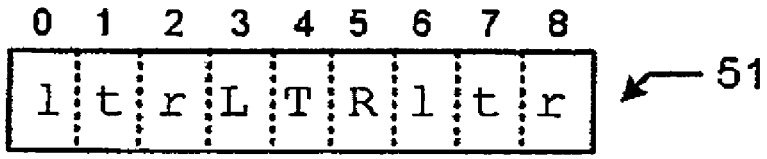

Referring to FIG. 3A for descriptive purposes only, the prior art technique of display of editing location requires the visual display of a so-called caret whose purpose is to give the user of a computer system feedback as to what positional context is current for insertion or deletion operations.

FIG. 3A depicts storage of textual data in a document data file. The storage sequence 50 depicts three characters 'Red' whose display color is red followed by four characters 'Blue' whose display color is blue implying that the color description is stored as metadata in the document file. Furthermore, the storage sequence 51 depicts three characters 'ltr' whose display direction is so-called left-to-right followed by three characters 'LTR' whose display direction is so-called right-to-left followed by three characters 'ltr' whose display direction is so-called left-to-right.

Figure 3B:
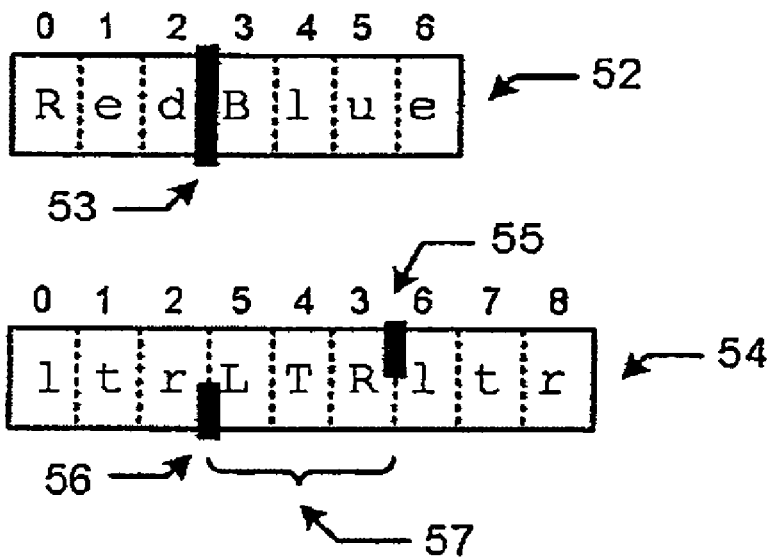
FIG. 3B is a diagram illustrating visual displays of the data from FIG. 3A.

FIG. 3B depicts visual display of the storage character sequences from FIG. 3A. The display shown in 52 depicts the character sequence from 50 with an editing caret 53 positioned at the character offset 3 from the start of the storage buffer 50. The display shown at 54 depicts the character sequence from 51 reordered into visual display order and displaying a so-called split caret positioned at the character offset 3 from the start of the storage buffer 51 whose insertion locations are visually presented as 55 and 56 whilst 57 delimits the change of character display direction.

Figure 6:
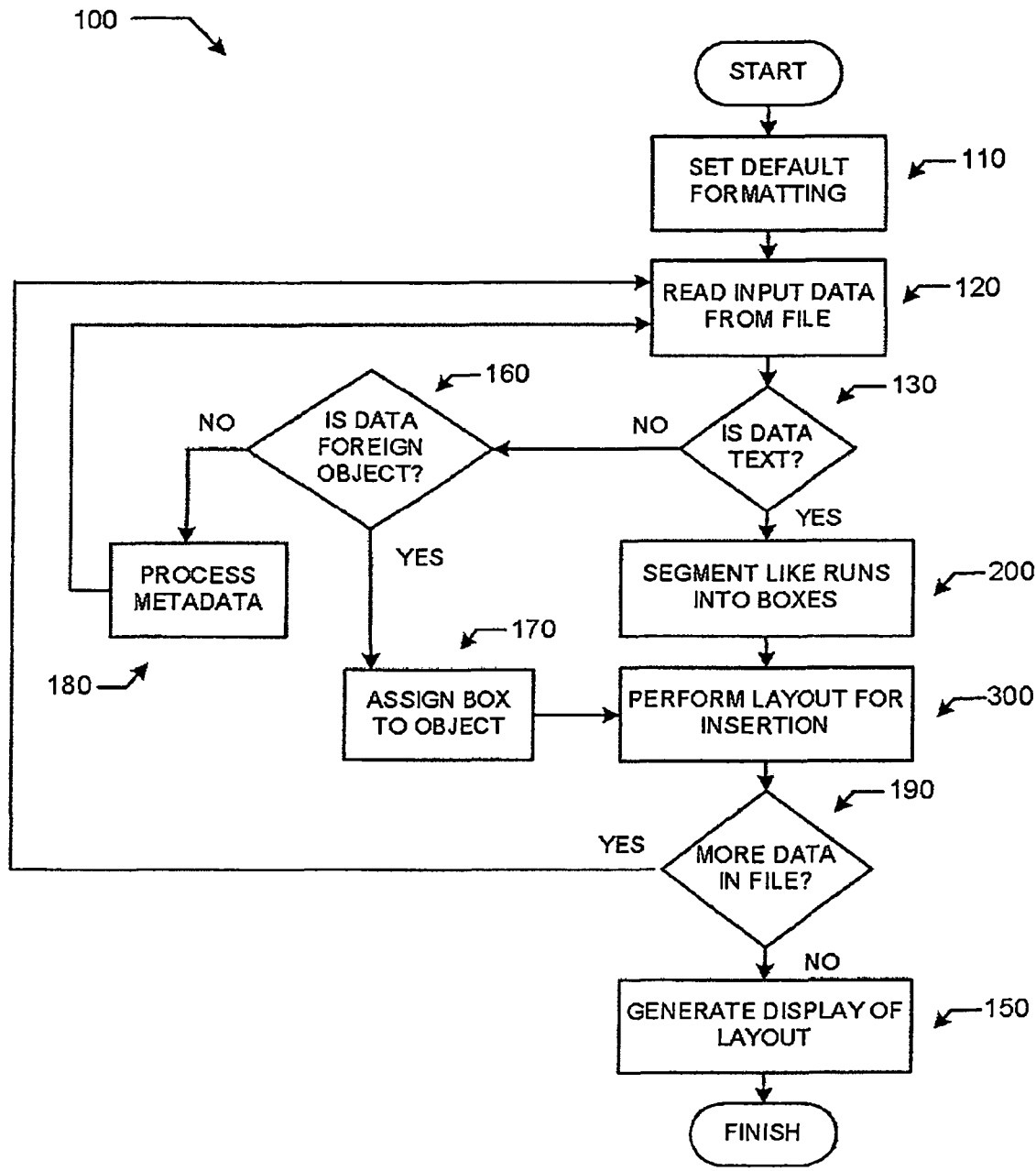
FIG. 6 is a flow diagram illustrating a method for creating a visual representation of a document file on a computer system.

Referring to FIG. 6, the method of the illustrative embodiment is shown. A process 100 is used to read a document file on a computer system for the purpose of generating a visual display of the document contents. All visual display objects consume one or more 'atoms', an atom being either a single Unicode character or an externally defined object such as an image object, the container for atoms being a so-called 'box' and all insertion for the purposes of display using the atom position as reference. A first step 110 sets up default presentation parameters for textual content of the file such as font family, size, style and height. A subsequent step 120 reads a data section of the file from the storage medium. A conditional step 130 decides if the read data is textual content. If the data at step 130 is textual content processing continues at procedure 200 where the textual content is segmented into sequences of like Unicode bidirectional embedding level and writing system which are placed into so-called 'boxes' whose metrication is based on a so-called 'atom' count which is equivalent to the number of Unicode characters inside each box. Following procedure 200 the layout procedure 300 is performed to place the textual content for display on a visual medium. A conditional step 190 determines whether more content is presented in the document file and if so, processing continues at step 120. Should step 130 determine that read data is not of type text, processing continues at step 160. The conditional step 160 decides if the read data is of type foreign object, the type of foreign object being that of an image or other externally defined data type other than text. If step 160 determines that the read data is of type foreign object a visual display box whose atom count is one is assigned to the foreign object in step 170 and processing continues at procedure 300. If step 160 determines that the read data is formatting metadata processing continues at step 180 where the visual display of subsequent document data is modified and processing continues at step 120. Should the conditional processing step 190 determine that no more document content exists in the document file processing continues to step 150. Step 150 generates a visual representation of all the boxes generated in procedure 200 and step 170 in combination with the results from procedure 300 and displays them to the user of the computer system.

Figure 7:
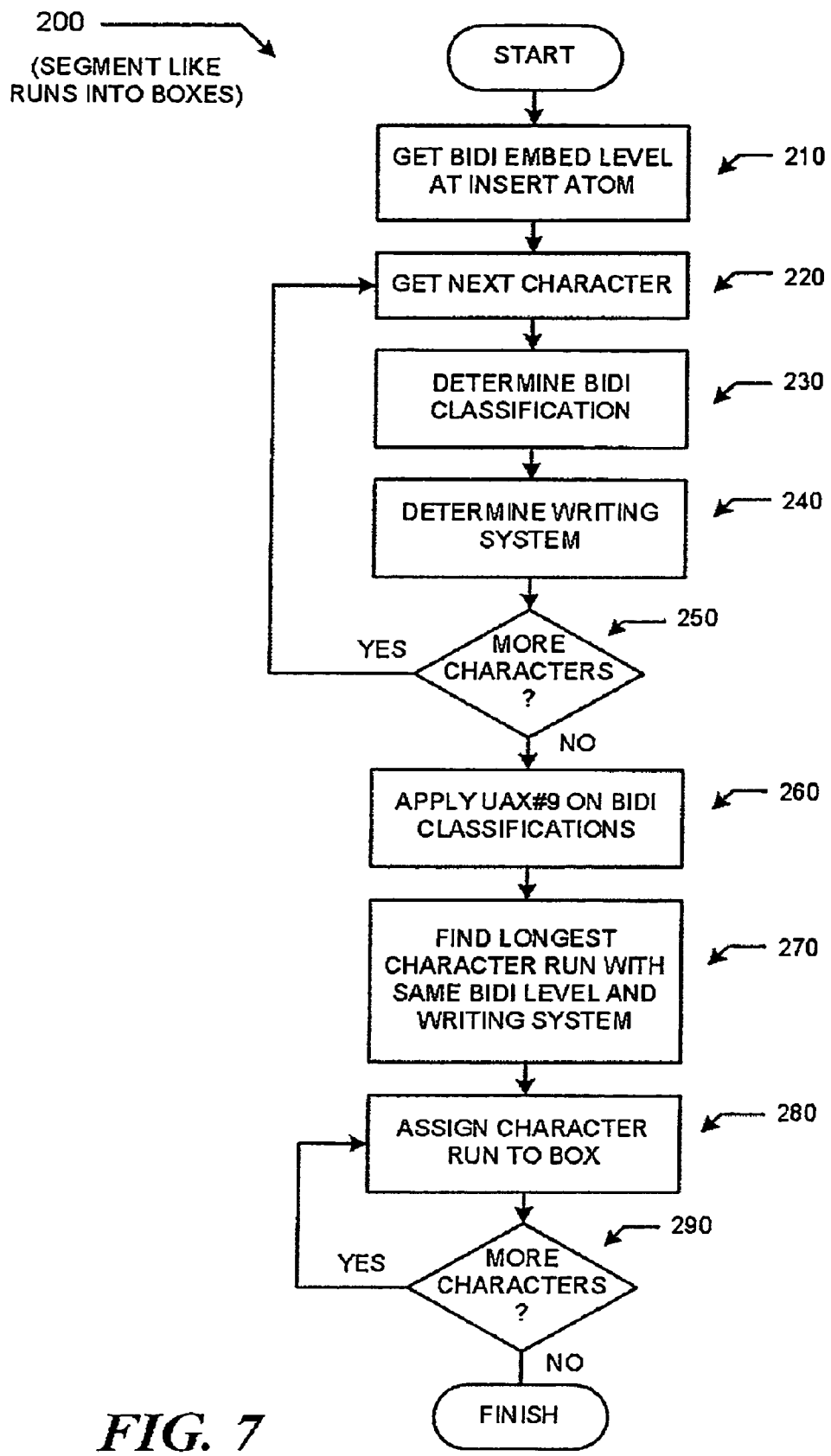
FIG. 7 is a flow diagram illustrating a method for segmenting like sequences of characters into logically related sets.

Referring to FIG. 7, the method of the illustrative embodiment segmenting like text runs into boxes 200 is shown in more detail. A first step 210 obtains the current Unicode bidirectional embedding level at the given insertion location atom. A subsequent step 220 obtains the next Unicode character value followed by a step 230 which classifies the Unicode character into its associated Unicode Bidirectional classification value and optionally stores that value in a temporary buffer. Step 230 which determines the Unicode Bidirectional classification for a Unicode character performs the classification according to a method illustrated as an example in Table 1 below and is described in pseudo-code resembling the computer programming language known as "C" as would be familiar to a practitioner in the art of computer programming. The method of Step 230 illustrated in Table 1 is a hybrid classification scheme that combines tree-based lookup, table lookup and perfect hashing into a single optimized classification scheme, where the general method is illustrated in Table 1 and the complete method for all Unicode character values is omitted for clarity but would be easily extrapolated by a person skilled in the art of computer programming. It is well-known that the so-called 'switch' statement in the computer programming language "C" is optimized by the program compiler into a number of different embodiments, those being either a conditional evaluation of all cases, a lookup table on all cases or a perfect hash of all cases in the 'switch' statement'. Step 230 takes advantage of compiler optimization methods which determine whether a conditional evaluation of all cases or a lookup table or a perfect hash is best suited to evaluating a set of values. Step 230 further uses as a first step a tree based comparison of Unicode character values to segment ranges of Unicode values and as a so-called 'leaf' step reverts to the 'switch' statement which by implication utilizes conditional evaluation, lookup table or perfect hash to complete classification where the choice of 'leaf' method is evaluated by complex optimization criteria under control of the program compiler and resulting in a deepest tree-depth comparison level of six (6) combined with hash lookup resulting in a final memory size less than 4,600 bytes which is smaller than a pure perfect-hash method encoding the exception list and does not incur the high computational cost of a pure perfect-hash approach nor the computational cost as a result of tree depth in a pure tree based comparison.

TABLE 1

Unicode Character Bidirectional Classification

```
#defineBCT_STRONG        0x400 /**< Strong set ar all >= this           */
#defineBCT_WEAK          0x200 /**< Weak set are >= this & less
                         * than the strong set                          */
#defineBCT_NEUTRAL       0x100 /**< Neutral range                       */
/*
* Bidirectional character types
*/
typedef enum
{
  UCT_B                  = BCT_NEUTRAL,
  UCT_S,
  UCT_WS,
  UCT_ON,
  UCT_PDF                = BCT_WEAK,
  UCT_EN,
  UCT_ES,
  UCTI_ET,
  UCT_AN,
  UCT_CS,
  UCTI_NSM,
  UCT_BN,
  UCT_L                  = BCT_STRONG,
  UCT_LRE,
  UCT_LRO,
  UCT_R,
  UCTI_AL,
  UCT_RLE,
  UCT_RLO,
}UAX9_CharType;
typedef enum
{
  /*
  *   Control characters
  */
  RUNE_NUL               = 0x0000,
  RUNE_SOH               = 0x0001,
  RUNE_STX               = 0x0002,
  RUNE_ETX               = 0x0003,
  RUNE_EOT               = 0x0004,
  RUNE_ENQ               = 0x0005,
  RUNE_ACK               = 0x0006,
  RUNE_BEL               = 0x0007,
  RUNE_BS                = 0x0008,
  RUNE_HT                = 0x0009,
  RUNE_LF                = 0x000A,
  RUNE_VT                = 0x000B,
  RUNE_FF                = 0x000C,
  RUNE_CR                = 0x000D,
  RUNE_SO                = 0x000E,
  RUNE_SI                = 0x000F,
  RUNEI_DLE              = 0x0010,
  RUNE_DC1               = 0x0011,
  RUNE_DC3               = 0x0013,
  RUNE_DC4               = 0x0014,
  RUNE_NAK               = 0x0015,
```

TABLE 1-continued

Unicode Character Bidirectional Classification

| | |
|---|---|
| RUNE_SYN | = 0x0016, |
| RUNE_ETB | = 0x0017, |
| RUNE_CAN | = 0x0018, |
| RUNE_EM | = 0x0019, |
| RUNE_SUB | = 0x001A, |
| RUNE_ESC | = 0x001B, |
| RUNE_FS | = 0x001C, |
| RUNE_GS | = 0x001D, |
| RUNE_RS | = 0x001E, |
| RUNE_US | = 0x001F, |

```
/*
 * Space and start of plain ASCII set
 */
```

| | |
|---|---|
| RUNE_SPACE | = 0x0020, |
| RUNE_EXCL | = 0x0021, |
| RUNE_QUOT | = 0x0022, |
| RUNE_NUMBER | = 0x0023, |
| RUNE_DOLLAR | = 0x0024, |
| RUNE_PERCENT | = 0x0025, |
| RUNE_AMPERSAND | = 0x0026, |
| RUNE_APOSTROPHE | = 0x0027, |
| RUNE_LPAREN | = 0x0028, |
| RUNE_RPAREN | = 0x0029, |
| RUNE_ASTERISK | = 0x002A, |
| RUNE_PLUS | = 0x002B, |
| RUNE_COMMA | = 0x002C, |
| RUNE_MINUS | = 0x002D, |
| RUNE_FULLSTOP | = 0x002E, |
| RUNE_SOLIDUS | = 00x002F, |
| RUNE_ZERO | = 0x0030, |
| RUNE_ONE | = 0x0031, |
| RUNE_TWO | = 0x0032, |
| RUNE_THREE | = 0x0033, |
| RUNE_FOUR | = 0x0034, |
| RUNE_FIVE | = 0x0035, |
| RUNE_SIX | = 0x0036, |
| RUNE_SEVEN | = 0x0037, |
| RUNE_EIGHT | = 0x0038, |
| RUNE_NINE | = 0x0039, |
| RUNE_COLON | = 0x003A, |
| RUNE_SEMICOLON | = 0x003B, |
| RUNE_LESSTHAN | = 0x003C, |
| RUNE_EQUALS | = 0x003D, |
| RUNE_GREATTHAN | = 0x003E, |
| RUNE_QUESTION | = 0x003F, |
| RUNE_AT | = 0x0040, |
| RUNE_LSQUARE | = 0x005B, |
| RUNE_RSOLIDUS | = 0x005C, |
| RUNE_RSQUARE | = 0x005D, |
| RUNE_CIRCUMFLEX | = 0x005E, |
| RUNE_LOWL1NE | = 0x005F, |
| RUNE_GRAVE | = 0x0060, |
| RUNE_LCURLY | = 0x007B, |
| RUNE_BAR | = 0x007C, |
| RUNE_RCURLY | = 0x007D, |
| RUNE_TILDE | = 0x007E, |
| RUNE_DELETE | = 0x007F, |
| RUNE_Cl_80 | = 0x0080, |
| RUNE_Cl_81 | = 0x0081, |
| RUNE_BRK_PERM | = 0x0082, |
| RUNE_NO_BRK_HERE | = 0x0083, |
| RUNE_C1_84 | = 0x0084, |
| RUNE_NEL | = 0x0085, |
| RUNE_ST_OF_SEL | = 0x0086, |
| RUNE_END_OF_SEL | = 0x0087, |
| RUNE_TAB_SET | = 0x0088, |
| RUNE_TAB_SET_JST | = 0x0089, |
| RUNE_LINE_TAB | = 0x008A, |
| RUNE_PART_LFORW | = 0x008B, |
| RUNE_PART_LBACKW | = 0x008C, |
| RUNE_REV_LF | = 0x008D, |
| RUNE_SNGL_SHIFT2 | = 0x008E, |
| RUNE_SNGL_SHIFT3 | = 0x008F, |
| RUNE_DEV_CTL_STR | = 0x0090, |
| RUNE_PRIV_USE_1 | = 0x0091, |
| RUNE_PRIV_USE_2 | = 0x0092, |
| RUNE_SET_TX_ST | = 0x0093, |

TABLE 1-continued

Unicode Character Bidirectional Classification

| | |
|---|---|
| RUNE_CANCEL_CH | = 0x0094, |
| RUNE_MSG_WAITING | = 0x0095, |
| RUNE_SO_GAURDED | = 0x0096, |
| RUNE_EO_GUARDED | = 0x0097, |
| RUNE_SO_STRING | = 0x0098, |
| RUNE_C1_99 | = 0x0099, |
| RUNE_SNGL_CH_INT, | = 0x009A |
| RUNE-CSEQ_INT | = 0x009B, |
| RUNE_STR_TERM | = 0x009C, |
| RUNE_OS_CMD | = 0x009D, |
| RUNE_PRIV_MESS | = 0x009E, |
| RUNE_APC | = 0x009F, |
| RUNE_NBSP | = 0x00A0, |
| RUNE_INVEXCL | = 0x00A1, |
| RUNE_CENT | = 0x00A2, |
| RUNE_POUND | = 0x00A3, |
| RUNE_SURRENCY | = 0x00A4, |
| RUNE_YEN | = 0x00A5, |
| RUNE_BROKENBAR | = 0x00A6, |
| RUNE_SECTION | = 0x00A7, |
| RUNE_DIAERISIS | = 0x00A8, |
| RUNE_COPYRIGHT | = 0x00A9, |
| RUNE_FEMORDINAL | = 0x00AA, |
| RUNE_LPGUILLEMET | = 0x00AB, |
| RUNE_NOTSIGN | = 0x00AC, |
| RUNE_SOFTHYPHEN | = 0x00AD, |
| RUNE_RESGISTERED | = 0x00AE, |
| RUNE_MACRON | = 0x00AF, |
| RUNE_DEGREE | = 0x00B0, |
| RUNE_PLUSMINUS | = 0x00B1, |
| RUNE_SUPER2 | = 0x00B2, |
| RUNE_SUPER3 | = 0x00133, |
| RUNE_ACUTE | = 0x00B4, |
| RUNE_MICRO | = 0x00B5, |
| RUNE_PILCROW | = 0x00B6, |
| RUNE_MIDDLEDOT | = 0x00B7, |
| RUNE_CEDILLA | = 0x00B8, |
| RUNE_SUPER1 | = 0x00B9, |
| RUNE_MASCORDINAL | = 0x00BA, |
| RUNE_RPGUILLEMET | = 0x00BB, |
| RUNE_VULQUART | = 0x00BC, |
| RUNE_VULHALF | = 0x00BD, |
| RUNE_VULTHRQUART | = 0x00BE, |
| RUNE_INVQUESTION | = 0x00BF, |
| RUNE_MULTIPLY | = 0x00D7, |
| RUNE_DIVIDE | = 0x00F7, |
| RUNE_o_WSTROKE | = 0x00F8, |
| RUNE_MLPRIME | = 0x02B9, |
| RUNE_ML_DBLPRIME | = 0x02BA, |
| RUNEML_TN_COMMA | = 0x02BB, |
| RUNEML_APOSTR | = 0x02BC, |
| RUNE_ML_RV_COMMA | = 0x02BD, |
| RUNE_ML_RHRING | = 0x02BE, |
| RUNE_ML_LHRING | = 0x02BF, |
| RUNE_ML_GLOT_ST | = 0x02C0, |
| RUNE_ML_RGLO | = 0x02C1, |
| RUNE_TRI_COLON | = 0x02D0, |
| RUNE_HTRI_COLON | = 0x02D1, |
| RUNE_SM_GAMMA | = 0x02E0, |
| RUNE_SM_L | = 0x02E1, |
| RUNE_SM_S | = 0x02E2, |
| RUNE_SM_X | = 0x02E3, |
| RUNE_SM_RGLOTTAL | = 0x02E4, |
| RUNE_DBL_APOST | = 0x02EE, |
| RUNE_CMB_GRV_ACC | = 0x0300, |
| RUNE_GK_EPS_WTON | = 0x0388, |
| RUNE_GK_RLUEPSIL | = 0x03F6, |
| RUNE_GK_NUMERAL | = 0x0374, |
| RUNE_GK_LO_NUM | = 0x0375, |
| RUNE_GK_YPOGRAM | = 0x037A, |
| RUNE_GK_QUESTION | = 0x037E, |
| RUNE_GK_TONOS | = 0x0384, |
| RUNE_GK_DIALYT | = 0x0385, |
| RUNE_GK_ALTON | = 0x0386, |
| RUNE_GK_ANOTEL | = 0x0387, |
| RUNE_GK_REV_LEPS | = 0x03F6, |
| RUNE_CY_TITLO | = 0x0483, |

TABLE 1-continued

Unicode Character Bidirectional Classification

```
    RUNE_CY_PALAT                = 0x0484,
    RUNE_CY_DASIA                = 0x0485,
    RUNE_CY_PSILI                = 0x0486,
    RUNE_CY_HTS                  = 0x0488,
    RUNE_CY_MILLION              = 0x0489,
    RUNE_AR_HYPHEN               = 0x058A,
    RUNE_GR_CAP_AN               = 0x10A0,
}UCD_CharValues;
/*
 *   Get the Unicode character database classification for a
 *   32-bit UTF-32 Unicode character code-point.
 */
UAX9_CharType
get_unicode_bidirectional_classification(unsigned long r)
{
   if (r <RUNE_GR_CAP_AN)          /* < 0x10A0*/
   {
      if (r <RUNE_AR_HYPHEN)       /* < 0x058A*/
      {
         if (r <RUNE_ML_PRIME)     /* < 0x02B9*/
         {
            if (r <RUNE_o_WSTROKE) /* < 0x00F8*/
            {
               /*
                * Switch below should end up in a jump table
                */
               switch (r) /* c0/c1 controls & most of latin-1 */
               {
               default:
                   goto do_left_to_right;
               case RUNE_NUL:
               case RUNE_SOH:
               case RUNE_STX:
               case RUNE_ETX:
               case RUNE EOT:
               case RUNE ENQ:
               case RUNE_ACK:
               case RUNE_BEL:
               case RUNE_BS:
               case RUNE_SO:
               case RUNE_SI:
               case RUNE_DLE:
               case RUNE_DC1:
               case RUNE_DC2:
               case RUNE_DC3:
               case RUNE_DC4:
               case RUNE_NAK:
               case RUNE_SYN:
               case RUNE_ETB:
               case RUNE_CAN:
               case RUNE_EM:
               case RUNE_SUB:
               case RUNE_ESC:
               case RUNE_DELETE:
               case RUNE_C1_80:
               case RUNE_Cl_81:
               case RUNE_BRK_PERM:
               case RUNE_NO_BRK_HERE:
               case RUNE_Cl_84:
               case RUNE_ST_OF_SEL:
               case RUNE_END_OF_SEL:
               case RUNE_TAB_SET:
               case RUNE_TAB_SET_JST:
               case RUNE_LINE_TAB:
               case RUNE_PART_LFORW:
               case RUNE_PART_LBACKW:
               case RUNE_REV_LF:
               case RUNE_SNGL_SHIFT2:
               case RUNE_SNGL_SHIFT3:
               case RUNE_DEV_CTL_STR:
               case RUNE_PRIV_USE_1:
               case RUNE_PRIV_USE_2:
               case RUNE_SET_TX_ST:
               case RUNE_CANCEL_CH:
               case RUNE_MSG_WAITING:
               case RUNE_SO_GAURDED:
               case RUNE_EO_GUARDED:
```

TABLE 1-continued

Unicode Character Bidirectional Classification

```
case RUNE_SO_STRING:
case RUNE_Cl_99:
case RUNE_SNGL_CH_INT:
case RUNE_CSEQ_INT:
case RUNE_STR_TERM:
case RUNE_OS_CMD:
case RUNE_PRIV_MESS:
case RUNE_APC:
case RUNE_SOFTHYPHEN:
   goto do_boundary_neutrals;
case RUNE_LF:
case RUNE_CR:
case RUNE_FS:
case RUNE_GS:
case RUNE_RS:
case RUNE_NEL:
   goto do_paragraph_separators;
case RUNE_HT:
case RUNE_VT:
case RUNE_US:
   goto_do_segment_separators;
case RUNE_FF:
case RUNE_SPACE:
   goto do_white_space;
case RUNE_EXCL:
case RUNE_QUOT:
case RUNE_AMPERSAND:
case RUNE_APOSTROPHE:
case RUNE_LPAREN:
case RUNE_RPAREN:
case RUNE_ASTERISK:
case RUNE_SEMICOLON:
case RUNE_LESSTHAN:
case RUNE_EQUALS:
case RUNE_GREATTHAN:
case RUNE_QUESTION:
case RUNE_AT:
case RUNE_LSQUARE:
case RUNE_RSOLIDUS:
case RUNE_RSQUARE:
case RUNE_CIRCUMFLEX:
case RUNE_LOWLINE:
case RUNE_GRAVE:
case RUNE_LCURLY:
case RUNE_BAR:
case RUNE_RCURLY:
case RUNE_TILDE:
case RUNE_INVEXCL:
case RUNE_BROKENBAR:
case RUNE_SECTION:
case RUNE_DIAERISIS:
case RUNE_COPYRIGHT:
case RUNE_LPGUILLEMET:
case RUNE_NOTSIGN:
case RUNE_RESGISTERED:
case RUNE_MACRON:
case RUNE_ACUTE:
case RUNE_PILCROW:
case RUNE_MIDDLEDOT:
case RUNE_CEDILLA:
case RUNE_RPGUILLEMET:
case RUNE_VULQUART:
case RUNE_VULHALF:
case RUNE_VULTHRQUART:
case RUNE_INVQUESTION:
case RUNE_MULTIPLY:
case RUNE_DIVIDE:
   goto do_other_neutrals;
case RUNE_NUMBER:
case RUNE_DOLLAR:
case RUNE_PERCENT:
case RUNE_CENT:
case RUNE_POUND:
case RUNE_CURRENCY:
case RUNE_YEN:
```

TABLE 1-continued

Unicode Character Bidirectional Classification

```
            case RUNE_DEGREE:
            case RUNE_PLUSMINUS:
                goto do_european_number_terminator;
            case RUNE_ PLUS:
            case RUNE_MINUS:
                goto do_european_number_separator;
            case RUNE_COMMA:
            case RUNE_FULLSTOP:
            case RUNE_SOLIDUS:
            case RUNE_COLON:
            case RUNE_NBSP:
                goto do_common_number_separator;
            case RUNE_ZERO:
            case RUNE_ONE:
            case RUNE_TWO:
            case RUNE_THREE:
            case RUNE_FOUR:
            case RUNE_FIVE:
            case RUNE_SIX:
            case RUNE_SEVEN:
            case RUNE_EIGHT:
            case RUNE_NINE:
            case RUNE_SUPER2:
            case RUNE_SUPER3:
            case RUNE_SUPER1:
                goto do_european_number;
            }
        }
        else                                    /* > 0x00F8 */
        {
            goto do_left_to_right;
        }
    }
    else                                        /* >= 0x02B9 */
    {
        if (r < RUNE_GK_RLUEPSEL)               /* < 0x03F6*/
        {
            if (r < RUNE_CMB_GRV_ACC)           /* < 0x0300*/
            {
                /*
                 * Switch below may produce a perfect hash
                 */
                switch (r)
                {
                default:
                    goto do_other_neutrals;
                case RUNE_ML_TN_COMMA:
                case RUNE_ML_APOSTR:
                case RUNE_ML_RV_COMMA:
                case RUNE_ML_RHRING:
                case RUNE_ML_LHRING:
                case RUNE_ML_GLOT_ST:
                case RUNE_ML_RGLOT_ST:
                case RUNE_TRI_COLON:
                case RUNE_HTRI_COLON:
                case RUNE_SM_GAMMA:
                case RUNE_SM_L:
                case RUNE_SM_S:
                case RUNE_SM_X:
                case RUNE_SM_RGLOTTAL:
                case RUNE_DBL_APOST:
                    goto do_left_to_right;
                }
            }
            else                                /* >= 0x0300 */
            {
                if (r < RUNE_GK_EPS_WTON) /* < 0x0388    */
                {
                    /*
                    *Switch below should produce a perfect hash
                    */
                    switch (r)
                    {
                    default:
                        goto do_non_spacing_mark;
                    case RUNE_GK_NUMERAL:
                    case RUNE_GK_ LO_ NUM:
```

TABLE 1-continued

Unicode Character Bidirectional Classification

```
                case RUNE_GK_QUESTION:
                case RUNE_GK_TONOS:
                case RUNE_GK_DIALYT:
                case RUNE_GK_ANOTEL:
                    goto do_other_neutrals;
                case RUNE_GK_YPOGRAM:
                case RUNE_GK_ALTON:
                    goto do_left_to_right;
                }
            }
            else                                    /* >= 0x0388 */
            {
                goto do_left_to_right;
            }
        }
    }
    else                                            /* >= 0x03F6 */
    {
        /*
         * Switch below should produce a perfect hash or
         * simple exception list.
         */
        switch (r)
        {
        default:
            goto do_left_to_right;
        case RUNE_GK_REV_LEPS:
            goto do_other_neutrals;
        case RUNE_CY_TITLO:
        case RUNE_CY_PALAT:
        case RUNE_CY_DASIA:
        case RUNE_CY_PSILI:
        case RUNE_CY_HTS:
        case RUNE_CY_MILLION:
            goto do_non_spacing_mark;
        }
    }
        }
    }
    else                                            /* >= 0x058A */
    {
        /* CLASSIFICATION CRITERIA FOR REMAINING CHARACTERS */
    }
}/* HANDLE >= 0x 10A0 here */
/*
 * Handle default case
 */
goto do_left_right;
/*
 * These are the categories in UAX9 Table 3-7. These actions are
 * common to all the classifications above. Stuck here for
 * clarity rather than inside the comparison tree. The compiler
 * will resolve all double jumps anyway.
 */
/**
 *                                                  NEUTRAL set
 */
/*
 *                                                  Paragraph separators (B)
 */
do_paragraph_separators:
    return UCT_B;
/*
 *                                                  Segment separators (S)
 */
do_segment_separators:
    return UCT_S;
/*
 * White space (WS)
 */
do_white_space:
    return UCT_WS;
/*
 * Other Neutrals (ON)
 */
do_other_neutrals:
    return UCT_ON;
```

TABLE 1-continued

Unicode Character Bidirectional Classification

```
/* *
 *                                          WEAK set
 */
/*
 *                                          Pop directional format (PDF)
 */
do_pop_directional_format:
    return UCT_PDF;
/*
 *                                          European Number (EN)
 */
do_european_number:
    return UCT_EN;
/*
 *                                          European number separator (ES)
 */
do_european_number_separator:
    return UCT_ES;
/*
 *                                          European number terminator (ET)
 */
do_european_number_terminator:
    return UCT_ET;
/*
 *                                          Arabic number (AN)
 */
do_arabic_number:
    return UCT_AN;
/*
 *                                          Common number separator (CS)
 */
do_common_number_separator:
    return UCT_CS;
/*
 *                                          Non-Spacing mark (NSM)
 */
do_non_spacing_mark:
    return UCT_NSM;
/*
 *                                          Boundary neutrals (BN)
 */
do_boundary_neutrals:
    return UCT_BN;
/**
 *                                          STRONG set
 */
/*
 *                                          Left to Right embedding (LRE)
 */
do_left_to_right_embedding:
    return UCT_LRE;
/*
 *                                          Left to Right override
 */
do_left_to_right_override:
    return UCT_LRO;
/*
 *                                          Right to Left
 */
do_right_to_left:
    return UCT_R;
/*
 *                                          Right to Left Arabic
 */
do_right_to_left_arabic:
    return UCT_AL;
/*
 *                                          Right to Left embedding (RLE)
 */
do_right_to_left_embedding:
    return UCT_RLE;
/*
 *                                          Right to Left override (RLO)
 */
```

TABLE 1-continued

Unicode Character Bidirectional Classification

```
do_right_to_left_override:
   return UCT_RLO;
   /*
   *                                           Left to Right (L)
   */
do_left_to_right:
   return UCT_L;                               /* default behaviour*/
}
```

A subsequent step 240 determines the writing system which may include some or all of the script definitions in the Unicode Specification as well as language and locale information obtained from the operating system of the computer system hosting the document display apparatus. The writing system determined in step 240 of the Unicode character may be stored in a temporary buffer then processing continues at conditional step 250 which determines if more characters require segmentation and if so, processing continues at step 220. If all textual characters have been processed execution continues at step 260 which retrieves the data generated in step 230 and applies the procedural steps required by the Unicode Bidirectional Algorithm to determine the Unicode Bidirectional embedding level of all the characters in the text. Following step 260 a subsequent step segments adjacent in storage order sets of textual characters into the same Unicode Bidirectional embedding level and writing system and assigns each such run into boxes, each box containing identical Unicode Bidirectional embedding level and writing system then processing continues at step 290. Conditional step 290 determines if more character runs exist in the storage character set and if so processing continues at step 280. If no further character runs exist processing is complete.

Figure 8:
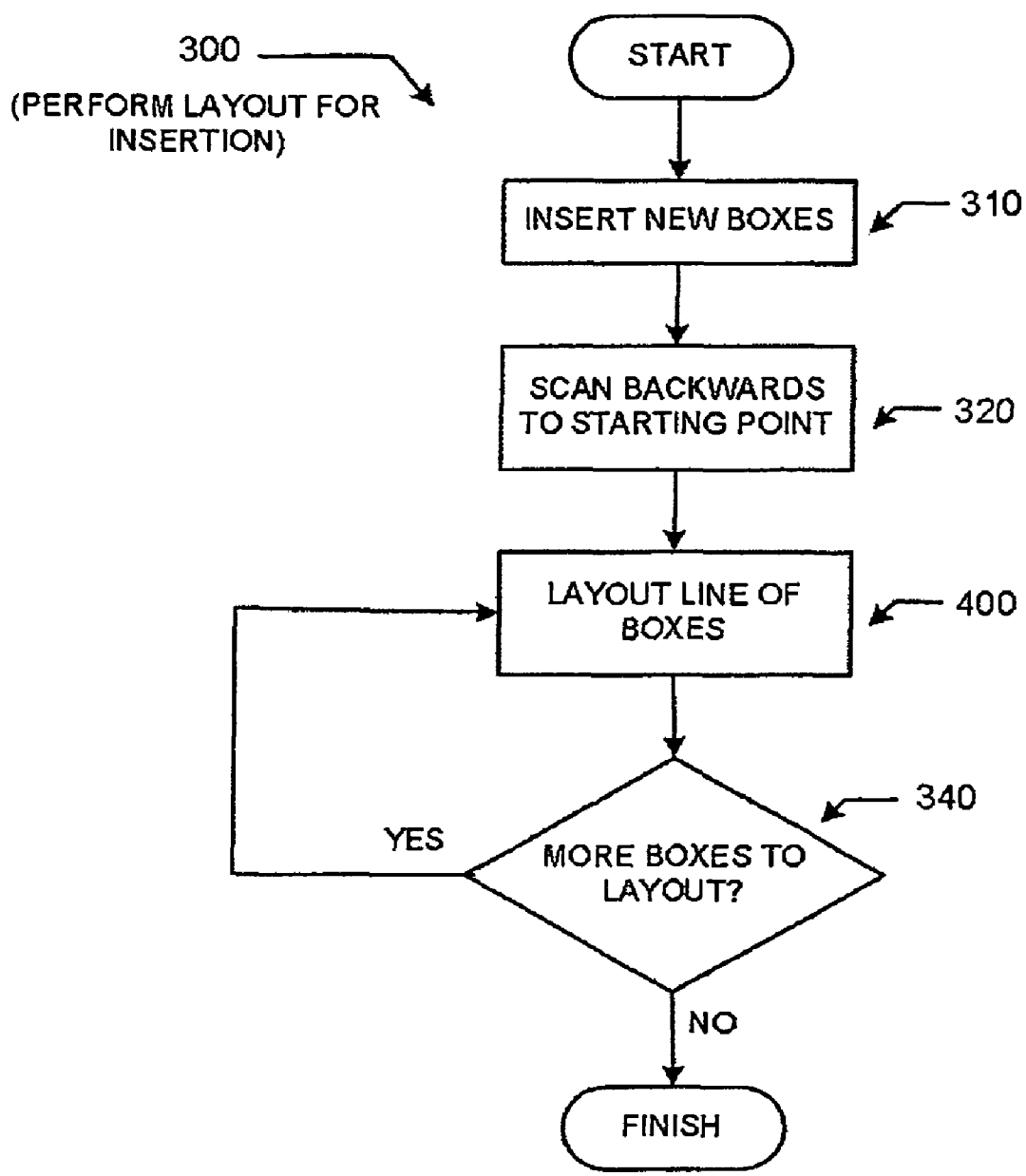
FIG. 8 is a flow diagram illustrating a method for performing a layout of document content following insertion of additional content data.

Referring to FIG. 8, the method of the illustrative embodiment performing a layout operation procedure 300 is shown. A first step 310 inserts new boxes containing content into the existing document layout at a predetermined atom position. A subsequent step 320 locates the insertion location atom position and scans backwards through any existing layout to determine the most interesting starting point that point being the start of a line, the start of a paragraph or any other starting point of interest under programmatic control of the user application program then processing continues at procedure 400. Procedure 400 performs the operation of layout of a line of boxes that reference document content then processing continues at conditional step 340. Conditional step 340 determines if there are more boxes to layout and if so processing continues at procedure 400. Should conditional step 340 determine that no further boxes require layout processing terminates.

Referring to FIG. 4, an example of the illustrative embodiment performing storage of visual insertion locations corresponding to storage locations of Unicode Bidirectional embedding level is shown in a horizontal layout on the so-called 'x' axis, the disclosed invention being applicable to other geometric layout directions. FIG. 4 illustrates the sequential insertion of boxes whose bidirectional embedding level changes where the insertion is equivalent to a sequential set of insertions identical to the input set of characters shown in the prior art illustration in FIG. 2. In FIG. 4 the column labeled "BIDI EMBED LEVEL" shows the current Unicode Bidirectional embedding level of inserted Unicode textual characters, the column labelled "STACK" shows the current visual insertion "MIN" and "MAX" locations which refer to visual positioning locations for insertions at a given Unicode Bidirectional embedding level and the column labelled "END 'X'" refers to the end visual positioning location. Example insertion of an initial box 40 whose textual content is the character 'X' at Unicode Bidirectional embedding level '0' is shown where 'S' refers to the start of the layout line and 'E' refers to the "END 'X'" location in display position. A subsequent row shows the insertion of a box whose character content is 'B' and whose Unicode Bidirectional embedding level is '1', this insertion causes an increase in the height of the Unicode Bidirectional insertion stack where the new stack entry has a depth of one (1) and is depicted by 42 as MIN=1, MAX=2 and is visually described by the display range shown as 41 whilst the "END 'X'" location is shown as 'E' and has geometric position 2. Increase of Unicode Bidirectional embedding level causes addition of an extra stack entry on the Unicode Bidirectional positioning stack and the concept of stack growth and reduction (also known as 'push' and 'pop') would be familiar to those skilled in the art of computer science and is subsequently referred to as the embed level insertion stack. FIG. 4 further shows incremental insertion of boxes up to a Unicode embedding level of 4 followed by incremental insertion of boxes down to a Unicode embedding level of 0 and illustrates the stack growth and shrinkage associated with those insertions. The stack entries store insertion points for insertion operations as will become apparent in the forthcoming description whilst E stores the end point of the line.

Figure 9:
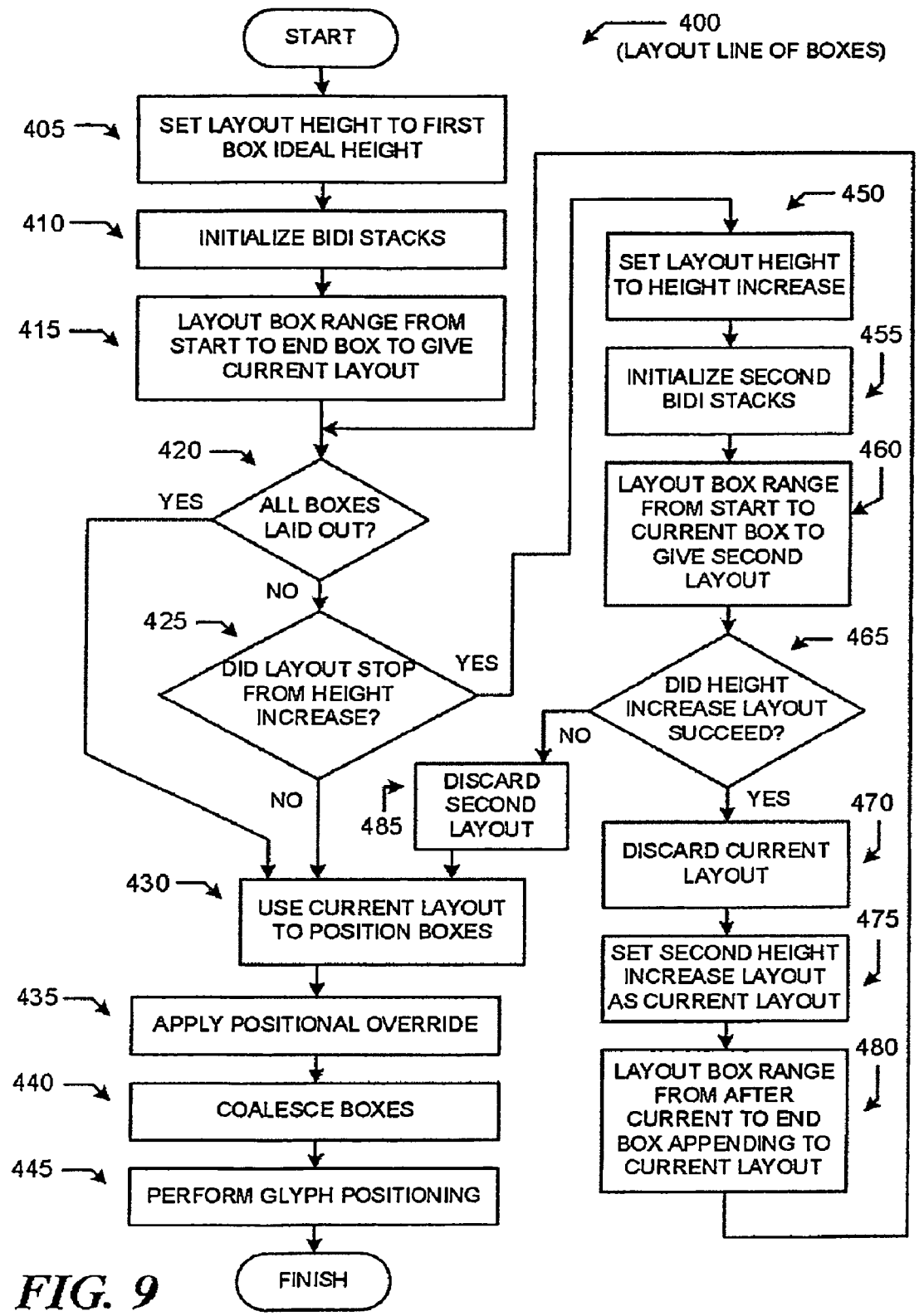
FIG. 9 is a flow diagram illustrating a method for positioning a line of content in a document for eventual display purposes.

Referring to FIG. 9, the method of the illustrative embodiment performing layout of a line of boxes is shown as procedure 400. A first step 405 sets the layout height for the line to be equal to the optimal line height for the first box to be placed in text cases the font height of text referenced by the box or in foreign object cases the height of the foreign object. A subsequent step 410 initializes an insertion stack of Unicode Bidirectional insertion levels to be equivalent to the starting 'x' insertion position on the line which becomes the current BIDI stack. A subsequent step 415 attempts to layout a box range from the starting box index to the ending box index by use of procedure 500 whose output is a set of positions for the candidate boxes which is known as the current layout. A subsequent conditional step 420 determines if all boxes have had positions allocated and if so processing continues at step 430. Should conditional step 420 determine that more boxes remain in the candidate layout set processing continues at conditional step 425 which determines if layout terminated due to a required increase in line height and if not, processing continues at step 430. If conditional step 425 determines that layout terminated due to a requirement for an increase in line height processing continues at step 450. Step 450 initializes a new storage area for box positioning and sets the current line height to the increased line height required to position the box that necessitated a larger line height in order to be positioned after which processing continues at step 455. Step 455 initializes a second Unicode Bidirectional insertion stack whose insertion positions are set to the start of the candidate line layout on entry at step 405 followed by processing moving to step 460. Step 460 attempts to layout a box range from the starting box index to the box index causing the line height increase by use of procedure 500 whose output is a set of positions for the candidate boxes as a second set of box placement positions and then processing continues at step conditional step 465. Conditional step 465 determines if the layout at the increased line height failed and if so discards the result 485 from step 460 and then processing continues at step 430. If the layout at the increased line height succeeds processing continues at step 470. Step 470 discards the current layout and then processing continues at step 475 where the layout from step 460 becomes the current layout and the second BIDI insertion stack becomes the current BIDI insertion stack and then processing continues at step 480. Step 480 takes the current insertion BIDI stack and current layout and by use of procedure 500 continues to attempt to layout boxes from the box after the last placed box from step 460 up to the final candidate box requiring placement and then processing continues at conditional step 420. Step 430 positions boxes at their corresponding generated positions in the current layout which resulted as combined output from procedure 500 via the steps 415, 460 and 480. After step 430 an optional step 435 applies override to the box positioning which may include CSS relative positioning, Z-index positioning or more sophisticated adjustments to final box placement. Following step 435, a further step 440 analyzes the boxes on a single line and determines if any adjacent boxes abut and have identical characteristics, those being Unicode Bidirectional embedding level, writing system and display font characteristics and if so coalesces a plurality of boxes into a single box with common characteristics. A further step 445 processes all the boxes on a line and positions glyphs relative to the boxes taking into account line presentation characteristics such as alignment such as centering and justification then processing terminates.

Figure 10:
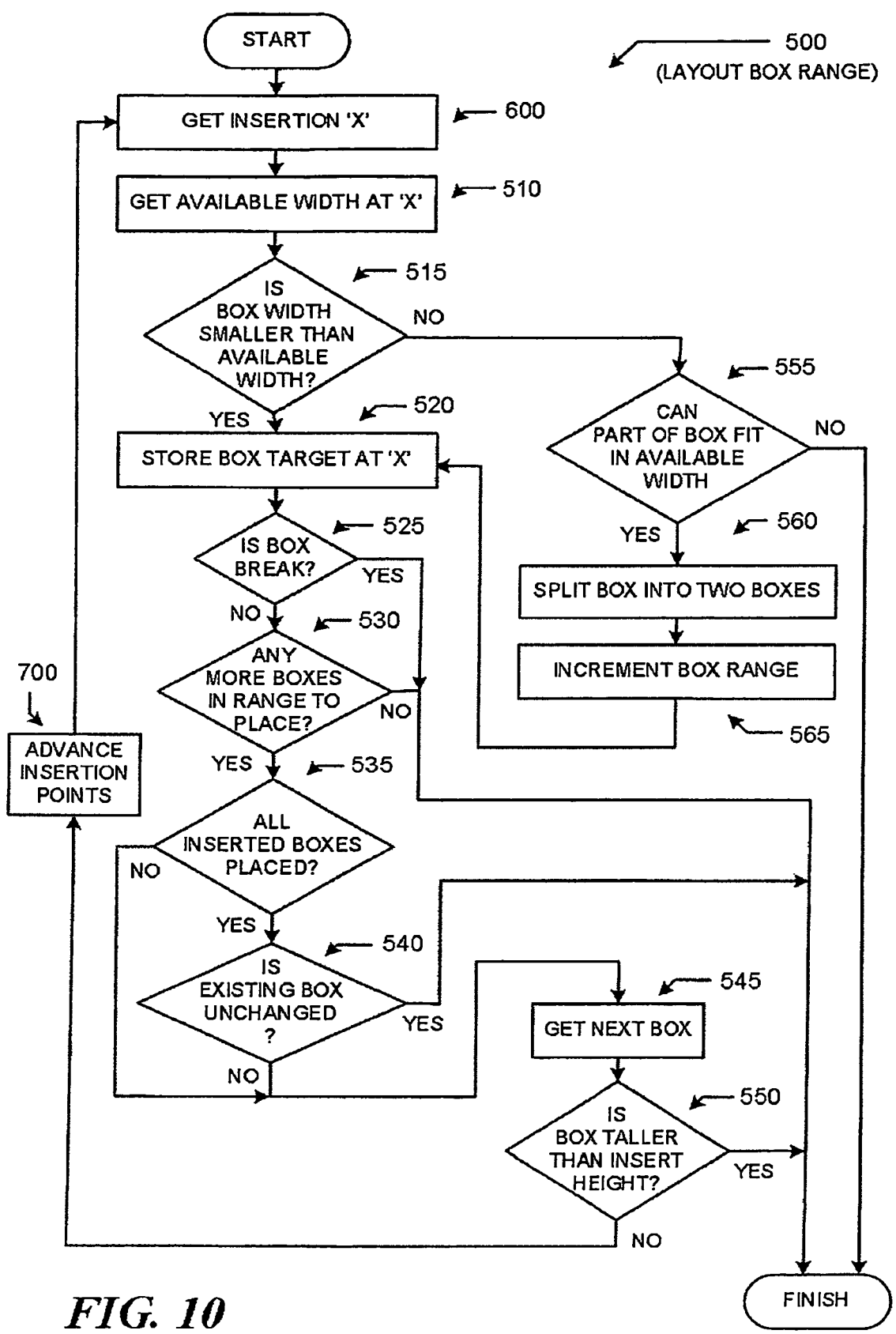
FIG. 10 is a flow diagram illustrating a method of layout of a sequence of content on a line at a given line height.

Referring to FIG. 10, the method of the illustrative embodiment performing layout of a range of boxes is shown. A first procedure 600 gets the insertion horizontal 'x' location for placement of a current box requiring placement. A subsequent step 510 determines the available with at 'x', in general this being the distance between the endpoint 'E' in FIG. 4 and the edge of the containing region, but in some cases where polygonal layout is used the computation must determine available span width at 'x'. A subsequent conditional step 515 determines if the box can fit in the available width and if so processing continues at step 520 where the target placement for the box is stored. A subsequent conditional step 525 determines if the box causes a line break and if so processing terminates. If the conditional step 525 determines that the box does not cause a line break processing continues at conditional step 530 which determines if any more boxes are available to place and if not processing terminates. If the conditional step 530 determines that more boxes are available to place processing continues at conditional step 535 which determines if all inserted boxes have been positioned and if not processing continues at step 545. If conditional step 535 determines that all inserted boxes have been placed conditional step 540 determines if remaining existing boxes from past layout passes are positioned correctly and if no change is required processing terminates. Step 545 retrieves the next box to be positioned and continues at conditional step 550 that determines if the next box to be positioned is taller than the current layout height and if so processing terminates. If step 550 determines that the next box to be positioned is no taller then the current line height processing transfers to procedure 700 which advances the insertion positions and then processing continues at procedure 600. If the conditional step 515 determines that the box to be placed is wider than the available width determined at step 510 processing continues at conditional step 555 which determines if the box can be split a plurality of smaller boxes where the first box will fit in the available width and if not processing terminates. If step 555 determines that the box may be split processing continues at step 560 where the box is split into two boxes at the maximal width for fitting the first box in the split pair of boxes within the available width. A subsequent step 565 increments the range of box count to account for the split box pair, processing then continues at step 520 where the positioning information for the newly split box is stored.

Figure 11:
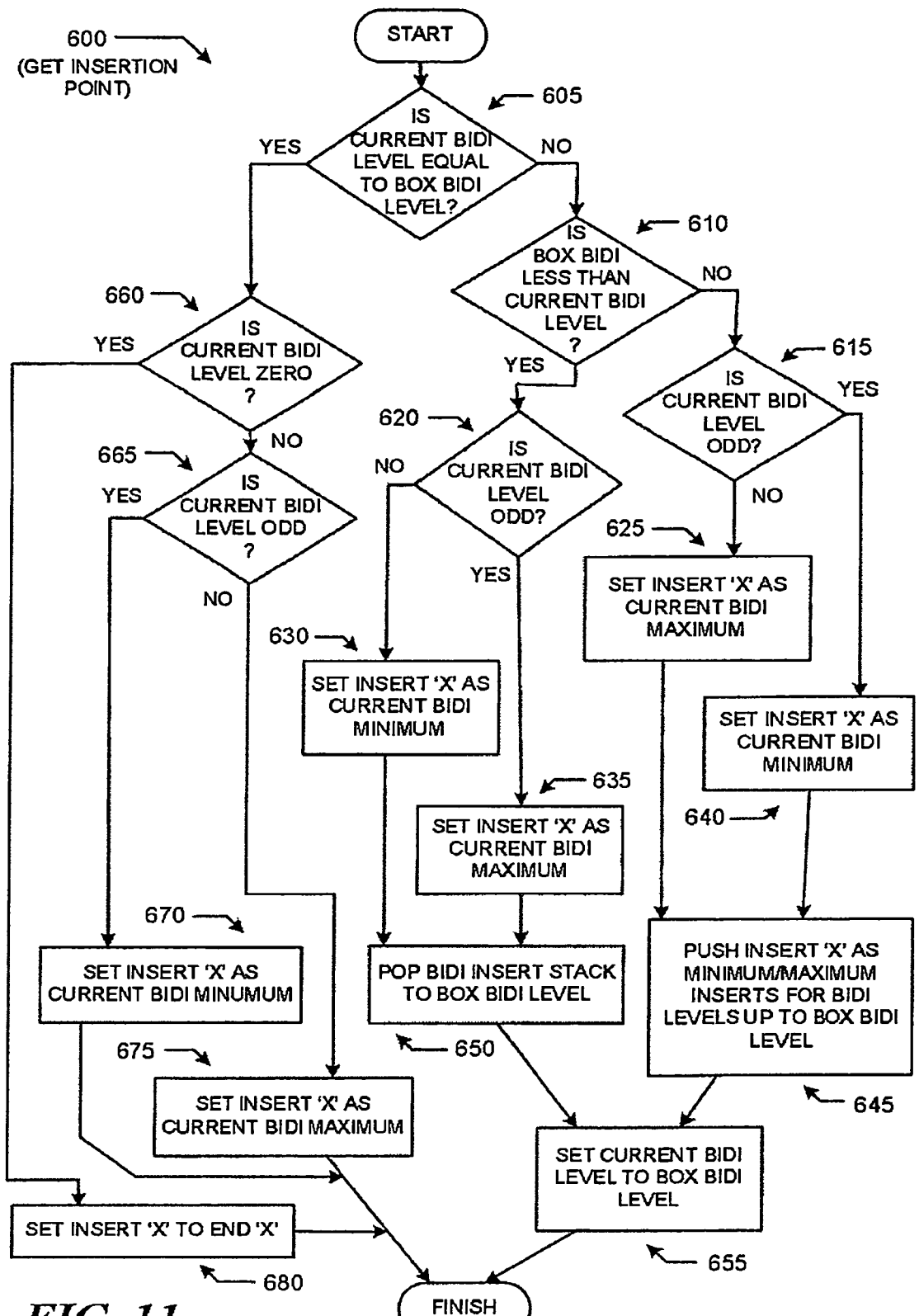
FIG. 11 is a flow diagram illustrating a method of selection of insertion location on a line for text content having bidirectional Unicode classification level.

Referring to FIG. 11, the method of the illustrative embodiment for determining the insertion point for a given Unicode Bidirectional embedding level on a line is shown as process 600 where the initial condition is a current embedding level. Conditional step 605 determines if the current embedding level is equal to the box embedding level and if so processing moves to conditional step 660. Conditional step 660 determines if the current Unicode Bidirectional embedding level is zero (0) and if so processing continues at step 680 where the insertion point is set to the end point and then processing terminates. If conditional step 660 determines that the current embedding level is non-zero then processing moves to conditional step 665 which determines if the current embedding level is odd and if so processing moves to step 670 which sets the insertion point to the minimum value of the embed level insertion stack at the current embed level and then processing terminates. If conditional step 665 determines that the box embed level is even processing continues at step 675 where the insertion point is set to the maximum value of the embed level insertion stack at the current embed level and then processing terminates. If conditional step 605 determines that the current embedding level is different to the box embedding level processing continues at conditional step 610 which determines if the box embedding level is less than the current embedding level and if so processing moves to conditional step 620. Conditional step 620 determines if the current embedding level is odd and if so processing continues at step 635 which sets the insertion point to the maximum value of the embed level insertion stack at the current embed level then processing continues at step 650. If conditional step 620 determines that the current embedding level is even processing continues at step 630 which assigns the minimum value of the embed level insertion stack at the current embed level then processing continues at step 650. Step 650 reduces the depth of the embed level insertion stack to the box embed level then processing continues at step 655. If conditional step 610 determines that the box embedding level is greater than the current embedding level processing continues at conditional step 615 which determines if the current embedding level is odd and if so processing continues at step 640 which sets the insertion point to the minimum value of the embed level insertion stack at the current embed level and processing continues at step 645. If conditional step 615 determines that the current embed level is even processing continues at step 625 which sets the insertion point to the maximum value of the embed level insertion stack at the current embed level and processing continues at step 645. Step 645 takes the current insertion location and pushes entries up to the box embed level onto the embed level insertion stack and during insertion all entries have their minimum and maximum insertion points set to the chosen insertion point then processing continues at step 655. Step 655 sets the current embed level to the box embed level then processing stops.

Figure 12:
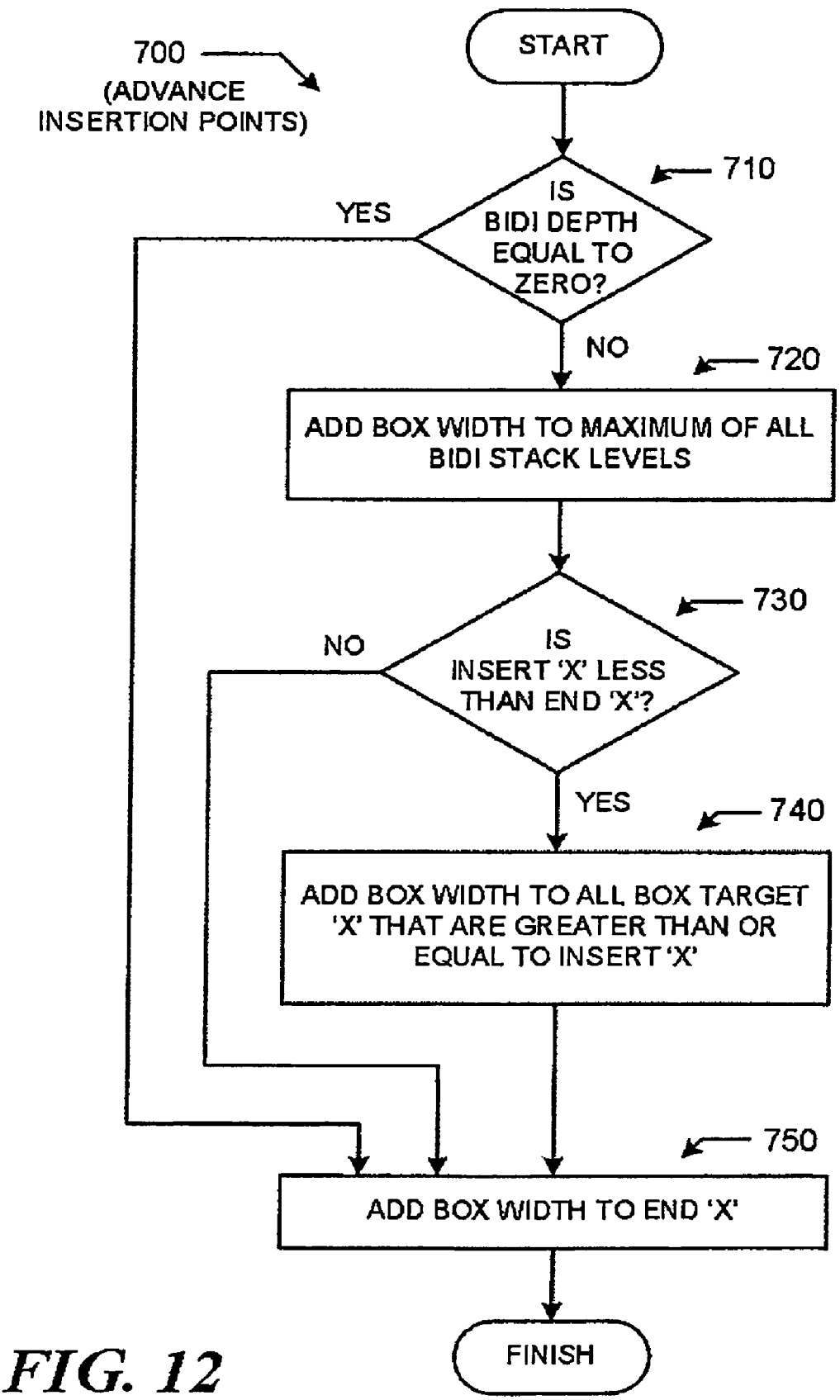
FIG. 12 is a flow diagram illustrating a method of update to insertion positions after an insertion of text at a given bidirectional Unicode classification level.

Referring to FIG. 12, the method of the illustrative embodiment for advancing the insertion points on a line as procedure 700 is shown. Conditional step 710 determines if the current embed level is zero and if so processing continues at step 750. If conditional step 710 determines that the current embed level is greater than zero processing continues at step 720 where the box width is added to all maximum entries on the embed level insertion stack, processing the continues at conditional step 730. Conditional step 730 determines if the insertion 'x' for the box is less than the end point 'x' and if so processing continues at step 740 where any positioned boxes at a point equal to or greater than the current insertion 'x' have their insertion position shifted in 'x' by the width of the box width the processing continues at step 750. If conditional step 730 determines that the insertion 'x' is equal to or greater than the end point 'x' processing continues at step 750. Step 750 adds the inserted box width to the end point 'x' then processing stops.

Figure 13:
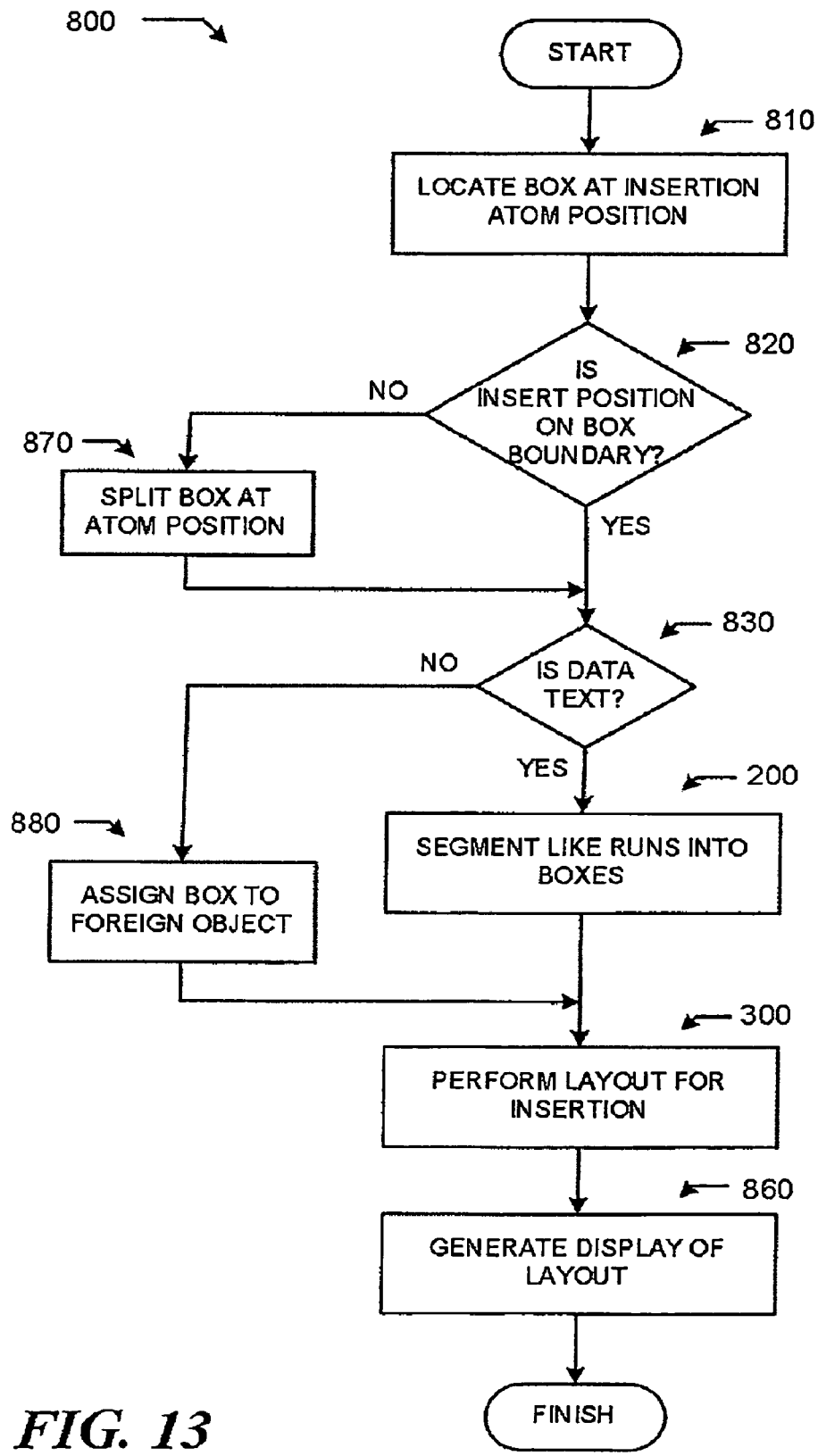
FIG. 13 is a flow diagram illustrating a method of modification of a displayed document whose representation is available for display purposes.

Referring to FIG. 13, the method of the illustrative embodiment for performing an insertion of new data into an existing layout as procedure 800 is shown. Step 810 locates the box containing the atom located at a specified insertion position. A further conditional step 820 determines if the insertion position is located at the boundary of a box and if not, processing continues at step 870 where the box containing the insertion atom position is split into two adjacent boxes to ensure that the insertion position is located on a box boundary and then processing continues at step 830. If the conditional step 820 determines that the insertion position is located on a box boundary processing continues at step 830. Conditional step 830 determines if the data to be inserted is of type text and if so processing continues at procedure 200 where the textual content is segmented into sequences of like Unicode bidirectional embedding level and writing system which are placed into so-called 'boxes' whose metrication is based on a so-called 'atom' count which is equivalent to the number of Unicode characters inside each box after which processing continues at step 300. Should the conditional step 830 determine that the inserted data is of type foreign object a visual display box whose atom count is one is assigned to the foreign object in step 880 and processing continues at procedure 300. Procedure 300 commences at the insertion starting position and lays out boxes until the newly inserted boxes have been positioned and any resultant repositioning of existing boxes is complete and as a result of layout may produce a geometric bounding box whose dimensions enclose all positioned boxes whose location has changed as a result of the layout operation and then processing continues at step 860. Step 860 generates a display of the newly positioned box data and optionally uses the bounding box produced by procedure 300 to minimize the redraw of boxes whose positional characteristics have changed as a result of the layout procedure 300 to limit the visual display update area on the computer display to those boxes whose location intersects the bound box produced by procedure 300.

Figure 14:
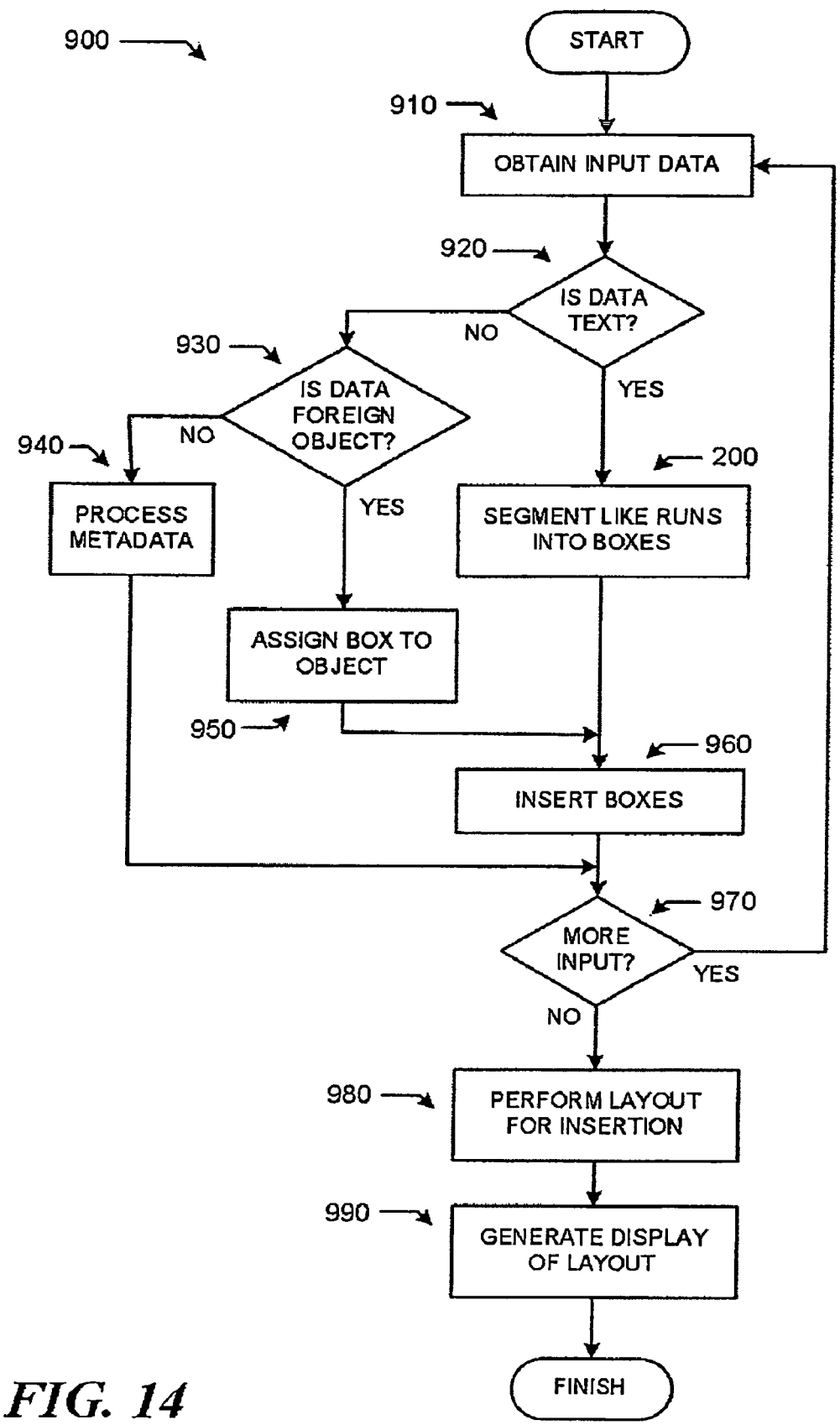
FIG. 14 is a flow diagram illustrating aggregated modifications of a displayed document whose representation is available for display purposes.

Referring to FIG. 14 the method of the illustrative embodiment for performing insertion of a plurality of new data into an existing layout whilst performing a single layout operation to position the aforementioned plurality of new data as procedure 900 is shown. An initial step 910 obtains new data to insert into an existing layout and then processing continues at conditional step 920. Conditional step 920 determines if the data to be inserted is of type text and if so processing continues at procedure 200 where the textual content is segmented into sequences of like Unicode bidirectional embedding level and writing system which are placed into so-called 'boxes' whose metrication is based on a so-called 'atom' count which is equivalent to the number of Unicode characters inside each box after which processing continues at step 960. Should step 920 determine that the inserted data is not text processing continues at conditional step 930 which determines if the data is of type foreign object and if so processing continues at step 950 where a visual display box whose atom count is one is assigned to the foreign object and processing continues at step 960. If the conditional step 930 determines that the read data is formatting metadata processing continues at step 940 where the visual display of subsequent document data is modified and processing continues at step 970. Step 960 performs the operation of determining if the insert atom position for boxes is at a box boundary and if not, splits the box containing the insertion atom position into two boxes such that the insertion atom position lies on a box boundary and then inserts the new boxes into the corresponding atom insertion position delimited by the box boundary and processing continues at step 970. Conditional step 970 determines if more input data exists and if so processing continues at step 910. If conditional step 970 determines that no further insertion data is available processing continues at step 980. Step 980 performs a layout operation whose computational steps encompass the operation of steps 320 through 340 in FIG. 8, those being step 320 which locates the insertion location atom position of the earliest inserted data and scans backwards through any existing layout to determine the most interesting starting point, that point being the start of a line, the start of a paragraph or any other starting point of interest under programmatic control of the user application program followed by procedure 400 which performs the operation of layout of a line of boxes that reference document content followed by the conditional step 340 which determines if there are more boxes to layout and if so processing continues at procedure 400 and if conditional step 340 determine that no further boxes require layout processing terminates with output data generated being the geometric bounding box of all boxes whose geometric position has been modified as a result of step 980. Step 990 generates a display of the newly positioned box data and optionally uses the bounding box produced by step 980 to minimize the redraw of boxes whose positional characteristics have changed as a result of the layout step 980 to limit the visual display update area on the computer display to those boxes whose location intersects the bound box produced by step 980.

Figure 5A:
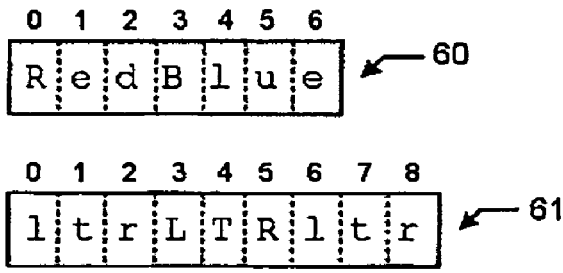
FIG. 5A is a diagram illustrating the storage of textual data in a document data file in accordance with the invention.
Figure 5B:
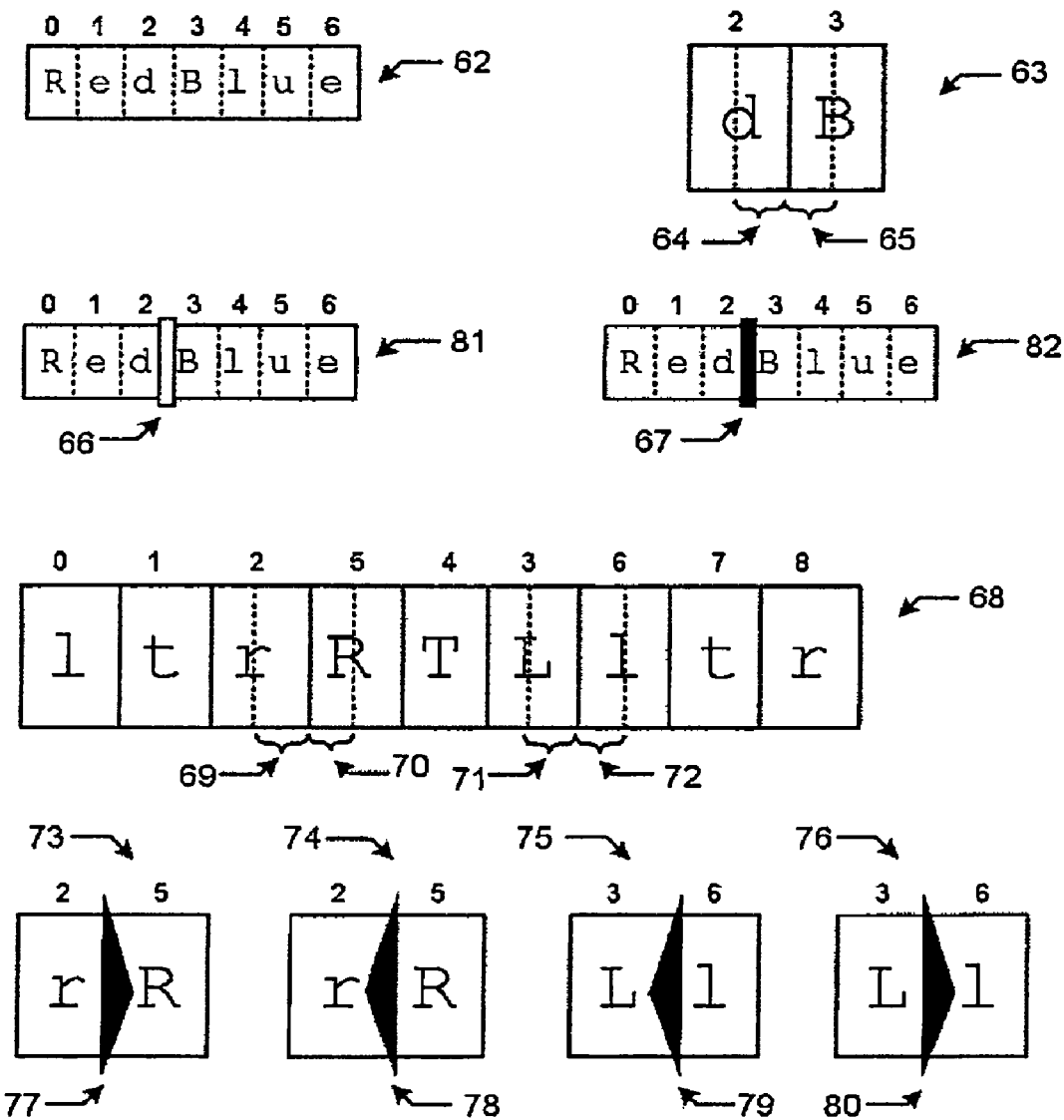
FIG. 5B is a diagram illustrating visual displays of the data from FIG. 5A.

Referring to FIG. 5 the method of the illustrative embodiment for selecting textual insertion characteristics and providing visual feedback to the user of the computer system executing a computer program utilizing the disclosed invention is shown. The object shown as 60 represents computer memory storage containing seven (7) Unicode characters in logical order, those being 'RedBlue'. The characters at storage location 0 through 2 inclusive contain the characters 'Red' and are displayed on the computer display in the color red whilst the characters at storage location 3 through 6 inclusive contain the characters 'Blue' and are displayed on the computer display in the color blue. The object shown at 62 represents the visual display of the Unicode characters in object 60 and their associated in-memory offsets whilst object 63 shows a subset of the display order shown in 62, that subset being the characters at offset 2 and 3 where the regions delimited by 64 and 65 indicate selection areas that would result in caret placement at offset 3 in the storage or logical buffer 60. On user interaction with the computer system to place the caret for text insertion by means of an appropriate pointing or selection device such as a mouse (14), the selection point at offset 3 in the buffer may be chosen by placing the pointing device in the area 64 which corresponds to the lagging edge of the character at offset 2 in the storage buffer 60 or by placing the pointing device in the area 65 which corresponds to the leading edge of the character at offset 3 in the storage buffer 60. Placement of selection point in either area 64 or 65 results in insertion of text at storage or logical offset 3 in the storage buffer 60 however it is an object of the present invention to distinguish the insertion textual characteristics at the chosen offset in the buffer by means of determining if area 64 or area 65 were the targets of said pointing device. If the pointing device was targeted at area 64 the textual formatting characteristics are derived from the lagging edge of the character at offset 2 in the storage buffer 60 and thus would be inserted at character position 3 in the storage buffer 60 and would be displayed on the computer display in the color red however if the pointing device was targeted at area 65 the textual formatting characteristics are derived from the leading edge of the character at offset 3 in the storage buffer 60 and would also be inserted at character position 3 in the storage buffer 60 but would be displayed on the computer display in the color blue. Illustration 81 shows the result of pointer device selection in the area 64, the caret 66 being displayed is shown as an outlined rectangle which could be displayed in the color red to distinguish the selection of the red text formatting for insertion, whilst illustration 82 shows the result of pointer selection in area 65, the caret 67 being displayed is shown as a solid rectangle which could be displayed in the color blue to distinguish the selection of the blue text formatting for insertion. Similarly if the pointing device was placed between adjacent display glyphs of different font styles, sizes, weights and so forth, the font formatting characteristics would be taken from the intersection of the pointer device selection point and the actual character cell containing the pointer device selection point as opposed to of the font formatting characteristics of the character at the insertion character offset in the storage buffer and the displayed selection caret be selected to provide visual feedback of the actual insertion font formatting characteristics. The object 61 represents computer memory storage containing nine (9) Unicode characters in logical order, those being 'ltrLTRltr' where the capitalized 'LTR' characters have a right-to-left display characteristic according to the Unicode Bidirectional algorithm. Illustration 68 shows the display order of the logical characters in 61. Illustration 68 further shows four distinct selection areas for insertion of text corresponding to two character offsets 3 and 6 where both locations correspond to the boundaries of alternating directional text. It is an object of the present invention to provide feedback to the user of an editing application program relating to the insertion direction as a result of pointer device selection. Pointer selection areas 69 and 71 both refer to insertion of text at character offset 3 in the storage buffer 61 whilst pointer selection areas 70 and 72 both refer to insertion of text at character offset 6 in the storage buffer 61. Placement of the pointing device in area 69 is illustrated 73 showing a caret display 77 indicating insertion is to be at character offset 3 in the storage buffer 61 with a text insertion direction of left-to-right, whilst placement of the pointing device in area 71 is illustrated 75 indicating insertion is to be at character offset 3 in the storage buffer 61 with a text insertion direction of right-to-left. Placement of the pointing device in area 70 is illustrated 74 showing a caret display 78 indicating insertion is to be at character offset 6 in the storage buffer 61 with a text insertion direction of right-to-left whilst placement of the pointing device in area 72 is illustrated 76 showing a caret display 80 indicating insertion is to be at character offset 6 in the storage buffer 61 with a text insertion direction of left-to-right.

It is evident that the foregoing description relates only to an exemplary embodiment of the present invention and that a plurality of changes may be made therein without departing from the spirit and scope of the invention as defined by the following claims.

What is claimed is:

1. In a computer system capable of storing and processing data, a method of positioning a plurality of Unicode textual character sequences of like directionality in storage sequence onto a display line comprising the steps of:
    (a) setting an equal insertion point for all Unicode Bidirectional embedding depth levels at the start point of insertion for the start point of the line;
    (b) determining if the size of a sequence of like directionality Unicode characters fit within the remaining space available on the line;
    (c) placing a sequence of like directionality Unicode characters at the insertion point;
    (d) updating the end point of line insertion according to the dimensions of the sequence of like directionality Unicode characters;
    (e) generating an insertion stack of insertion minimum and maximum positions for each Unicode Bidirectional embedding depth; and
    (f) updating entries in the insertion stack for each insertion of a sequence of like directionality Unicode characters.

2. The method of claim 1 wherein subsequent insertion of sequences of like directionality of Unicode characters use the insertion stack to choose placement position.

3. The method of claim 1 wherein the insertion stack minimum and maximum positions are set to the start position on a line should insertion of Unicode textual data result in exceeding the line size resulting in a line break requiring geometric layout from the beginning of a new line of displayed text.

4. In a computer system capable of storing and processing data, a method of modifying existing lines of textual display comprising the steps of:
    (a) identifying the geometric insertion position;
    (b) locating an in-memory buffer location corresponding to the geometric insertion position;
    (c) inserting an in-memory representation of the modification into the in-memory buffer at the in-memory buffer location corresponding to the geometric insertion point;
    (d) locating the in-memory buffer location corresponding to the start of the line of text containing the geometric insertion position;
    (e) geometrically placing the in-memory buffer data from the location corresponding to the start of the line up to the inserted in-memory representation of the modification;
    (f) geometrically placing the in-memory representation of the modification; and
    (g) geometrically placing in-memory buffer data following the modification until said placement produces no change in geometric positioning for the in-memory data.

5. The method of claim 4 wherein a bound box encompassing all geometric modifications is generated.

6. The method of claim 5 wherein the generated bound box is used to optimize the displayed update area on a computer display.

7. In a computer system capable of storing and processing data, a method of positioning a visual editing feedback display comprising the steps of:

(a) obtaining a selection point on a visual representation of text;
(b) obtaining a storage buffer insertion offset closest to the selection point;
(d) obtaining a displayed glyph intersected by the selection point;
(e) retrieving the display characteristics of the displayed glyph at the selection point; and
(f) using the display characteristics of the displayed glyph as formatting characteristics of inserted data at the storage buffer insertion offset closest to the selection point.

8. The method of claim 7 wherein the displayed caret at the storage buffer insertion offset closest to the selection point is colored according to the color of the displayed glyph intersected by the selection point.

9. The method of claim 7 wherein the displayed caret at the storage buffer insertion offset closest to the selection point is sized according to the sized of the displayed glyph intersected by the selection point.

10. The method of claim 7 wherein the displayed caret at the storage buffer insertion offset closest to the selection point has a thickness corresponding to the font weight of the displayed glyph intersected by the selection point.

11. The method of claim 7 wherein the displayed caret at the storage buffer insertion offset closest to the selection point has a directional indicator corresponding to the Unicode directionality of the characters mapped to the displayed glyph intersected by the selection point.

12. In a computer system capable of storing and processing data, a method of generating a first positioning of a plurality of Unicode textual character sequences of like directionality in storage sequence onto a display line comprising the steps of:
(a) setting an equal insertion point for all Unicode Bidirectional embedding depth levels at the start point of insertion for the start point of the line and setting a given line height;
(b) determining if the size of a sequence of like directionality Unicode characters fit within the remaining space available on the line;
(c) placing a sequence of like directionality Unicode characters at the insertion point bounded by the given line height;
(d) updating the end point of line insertion according to the dimensions of the sequence of like directionality Unicode characters;
(e) generating an insertion stack of insertion minimum and maximum positions for each Unicode Bidirectional embedding depth;
(f) updating entries in the insertion stack for each insertion of a sequence of like directionality Unicode characters;
(g) upon encountering an additional sequence of like directionality Unicode characters with increased line height performing a second positioning of all positioned sequences of like directionality Unicode characters at the increased line height; and
(h) choosing a given first positioning or a second positioning of sequences of like directionality Unicode characters.

13. The method of claim 12 wherein the decision of a given first or second positioning is dependent on successful positioning of an increased line height caused by an additional sequence of like directionality Unicode characters.

14. The method of claim 12 wherein the decision of a given first or second positioning is dependent on a user specified limitation on line height.

15. The method of claim 12 wherein the decision of a given first or second positioning is dependent on a user specified limitation on line spacing.

16. In a computer system capable of storing and processing data a method of positioning a plurality of Unicode textual character sequences of like directionality in storage sequence or externally defined image data onto a display line of limited size comprising the steps of:
(a) setting an equal insertion point for all Unicode Bidirectional embedding depth levels at the start point of insertion for the start point of the line;
(b) determining if the size of a sequence of like directionality Unicode characters or an externally defined image data object fit within the remaining space available on the line;
(c) placing a sequence of like directionality Unicode characters or an externally defined image data object at the insertion point;
(d) updating the end point of line insertion according to the dimensions of the sequence of like directionality Unicode characters or externally defined image object;
(e) generating an insertion stack of insertion minimum and maximum positions for each Unicode Bidirectional embedding depth; and
(f) updating entries in the insertion stack for each insertion of a sequence of like directionality Unicode characters or externally defined image object.

17. The method of claim 16 wherein subsequent insertion of sequences of like directionality Unicode characters or externally defined image objects use the insertion stack to choose placement position.

18. The method of claim 16 wherein the insertion stack minimum and maximum positions are set to the start position on a line should insertion of Unicode textual data or externally defined image object result in exceeding the line size resulting in a line break requiring geometric layout from the beginning of a new line of displayed text and image data.

* * * * *